US012780099B2

(12) United States Patent
Cho et al.

(10) Patent No.: US 12,780,099 B2
(45) Date of Patent: Nov. 3, 2026

(54) DIGITAL REAR MIRROR DEVICE CAPABLE OF ADJUSTING ANGLE OF VIEW WHILE DRIVING VEHICLE, AND OPERATING METHOD OF THE SAME

(71) Applicant: THINKWARE CORPORATION, Seongnam-si (KR)

(72) Inventors: Hyun Chul Cho, Seongnam-si (KR); Hyun Jin Bang, Seongnam-si (KR); Sung Rak Choi, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 18/897,170

(22) Filed: Sep. 26, 2024

(65) Prior Publication Data

US 2025/0100451 A1 Mar. 27, 2025

(30) Foreign Application Priority Data

Sep. 27, 2023 (KR) ........................ 10-2023-0130284
Sep. 11, 2024 (KR) ........................ 10-2024-0124094

(51) Int. Cl.
*B60R 1/28* (2022.01)
*H04N 23/695* (2023.01)

(52) U.S. Cl.
CPC ............. *B60R 1/28* (2022.01); *H04N 23/695* (2023.01); *B60R 2300/8046* (2013.01)

(58) Field of Classification Search
CPC .. B60R 1/28; B60R 2300/8046; H04N 23/695
See application file for complete search history.

(56) References Cited

U.S. PATENT DOCUMENTS

| | | | | | |
|---|---|---|---|---|---|
| 5,550,677 | A * | 8/1996 | Schofield | G01J 1/4204 348/E7.086 | |
| 8,297,763 | B2 * | 10/2012 | Lee | B60R 1/025 701/49 | |
| 9,973,734 | B2 * | 5/2018 | Watanabe | B60R 1/24 | |
| 10,315,571 | B2 * | 6/2019 | Moulton | H04N 7/18 | |
| 10,525,885 | B2 * | 1/2020 | Kumon | B60K 35/10 | |
| 10,618,469 | B2 * | 4/2020 | Hussler | H04N 23/695 | |
| 11,052,823 | B2 * | 7/2021 | Kumon | B60R 1/26 | |
| 11,247,610 | B2 * | 2/2022 | Carpenter | B60R 1/025 | |
| 11,588,963 | B2 * | 2/2023 | Rajhansa | B60R 1/28 | |

(Continued)

*Primary Examiner* — Brian P Yenke
(74) *Attorney, Agent, or Firm* — ZION IP; Byungwoong Park

(57) ABSTRACT

The present disclosure provides a digital rear mirror device capable of adjusting an angle of view while driving a vehicle and an operating method of the same. In the present disclosure, the digital rear mirror device is mounted to a vehicle and is configured to acquire driving information of the vehicle while driving the vehicle, to adjust an angle of view for a rear view video of the vehicle based on the driving information, and to display the rear view video according to the angle of view. The driving information may include at least one of speed information indicating a speed of the vehicle, steering information related to steering of the vehicle, and reverse information indicating whether the vehicle is reversing. The digital rear mirror device may expand or reduce the angle of view based on the driving information, or may move the center of the angle of view.

20 Claims, 14 Drawing Sheets

(56) References Cited

U.S. PATENT DOCUMENTS

2005/0259033 A1* 11/2005 Levine .................. G08G 1/165 345/7
2006/0290482 A1* 12/2006 Matsumoto ............ G08G 1/167 340/436
2007/0290886 A1* 12/2007 Stam ...................... G08G 1/052 340/907
2010/0073480 A1* 3/2010 Hoek ........................ G01P 1/08 348/148
2014/0267727 A1* 9/2014 Alaniz .................. H04N 7/183 348/148
2014/0277940 A1* 9/2014 VanVuuren ............... B60R 1/26 701/36
2014/0313335 A1* 10/2014 Koravadi ............... H04N 7/181 348/148
2014/0347489 A1* 11/2014 Kumon .................. B60K 35/22 348/148
2016/0284218 A1* 9/2016 Ejiri ....................... G08G 1/166
2017/0113609 A1* 4/2017 Li .................... G08G 1/096783
2017/0174133 A1* 6/2017 Kumon ..................... B60R 1/26
2018/0115708 A1* 4/2018 Amano ..................... B60R 1/28
2019/0113930 A1* 4/2019 Mimura ................. B60K 35/28
2019/0359132 A1* 11/2019 Zinner ................. H04N 23/695
2020/0010095 A1* 1/2020 Kim .................. B60W 50/0098
2020/0086794 A1* 3/2020 Kumon ..................... B60R 1/28
2020/0282908 A1* 9/2020 Xu .......................... B60R 11/04
2021/0166558 A1* 6/2021 Giraud ................. G08G 1/0133
2021/0250489 A1* 8/2021 Hong ..................... H04N 23/55
2022/0108602 A1* 4/2022 Kathuria .............. G08G 1/0112
2022/0141364 A1* 5/2022 Rajhansa ............... H04N 23/69 348/39
2023/0173982 A1* 6/2023 Wieczorek ............. G06V 20/56
2023/0254581 A1* 8/2023 Radnai ................... H04N 23/90 348/148
2023/0304242 A1* 9/2023 Bergerud .............. E01H 10/007
2024/0420486 A1* 12/2024 Jun ...................... G06V 20/588
2025/0104484 A1* 3/2025 Lee ........................ G06Q 20/34
2025/0153643 A1* 5/2025 Cho .......................... B60R 1/27
2025/0201115 A1* 6/2025 Yanagisawa ........... G08G 1/052

* cited by examiner

DIGITAL REAR MIRROR DEVICE CAPABLE OF ADJUSTING ANGLE OF VIEW WHILE DRIVING VEHICLE, AND OPERATING METHOD OF THE SAME

CROSS-REFERENCE TO RELATED APPLICATION(S)

This application claims the priority benefit under 35 U.S.C. § 119 to Korean Patent Application No. 10-2023-0130284, filed on Sep. 27, 2023 and Korean Patent Application No. 10-2024-0124094, filed on Sep. 11, 2024, in the Korean Intellectual Property Office, the entire contents of which are incorporated herein by reference in their entirety.

BACKGROUND

1. Field

The present disclosure relates to a digital rear mirror (DRM) device capable of adjusting an angle of view while driving a vehicle and an operating method of the same.

2. Description of Related Art

A driver that drives a vehicle needs to keep an eye on the rear while keeping an eye on the front while driving. To this end, the vehicle is equipped with a rear mirror (which may also be referred to as one of rear view mirror, back mirror, room mirror, and inside mirror). That is, the driver verifies the rear through the rear mirror while maintaining the forward-facing posture. However, due to a separate loading box providing a space for a passenger, an object, or a cargo behind the driver, a rear view of the driver is often blocked. This may lead to various risks.

SUMMARY

The present disclosure provides a digital rear mirror device capable of adjusting an angle of view while driving a vehicle and an operating method of the same.

In the present disclosure, a digital rear mirror device of a vehicle may include a display module configured to display a rear view video of the vehicle; and a processor configured to connect to the display module and to acquire driving information of the vehicle while driving the vehicle, and to adjust an angle of view for the rear view video based on the driving information.

In the present disclosure, an operating method of a digital rear mirror device of a vehicle may include acquiring driving information of the vehicle while driving the vehicle; adjusting an angle of view for a rear view video of the vehicle based on the driving information; and displaying the rear view video according to the angle of view.

In the present disclosure, a digital rear mirror system of a vehicle may include a camera device configured to capture a rear view video of the vehicle, and a digital rear mirror device configured to acquire driving information of the vehicle while driving the vehicle, to adjust an angle of view for the rear view video based on the driving information, and to display the rear view video according to the angle of view.

In the present disclosure, an operating method of a digital rear mirror system of a vehicle may include acquiring, by the digital rear mirror device, driving information of the vehicle while driving the vehicle, adjusting, by the digital rear mirror device, an angle of view for a rear view video of the vehicle based on the driving information, and receiving, by the digital rear mirror device, the rear view video received from the camera device according to the angle of view.

According to the present disclosure, since a digital rear mirror device displays a rear view video of a vehicle captured by a camera device, an unobstructed rear view may be provided to a driver of the vehicle. In particular, the digital rear mirror device may flexibly adjust an angle of view for the rear view video based on driving information of the vehicle, assisting the driver to safely drive the vehicle when driving the vehicle. That is, the digital rear mirror device may automatically provide the rear view necessary for the driver to drive the vehicle depending on a driving state of the vehicle. For example, the digital rear mirror device may adjust the angle of view when the vehicle changes a speed, changes a lane, or reverses.

DETAILED DESCRIPTION

Hereinafter, various example embodiments of the present document are described with reference to the accompanying drawings.

Figure 1:
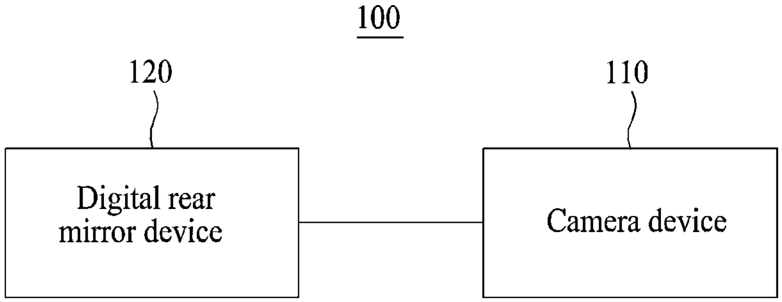
FIG. 1 is a block diagram illustrating a configuration of a digital rear mirror system according to various example embodiments.
Figure 2A:
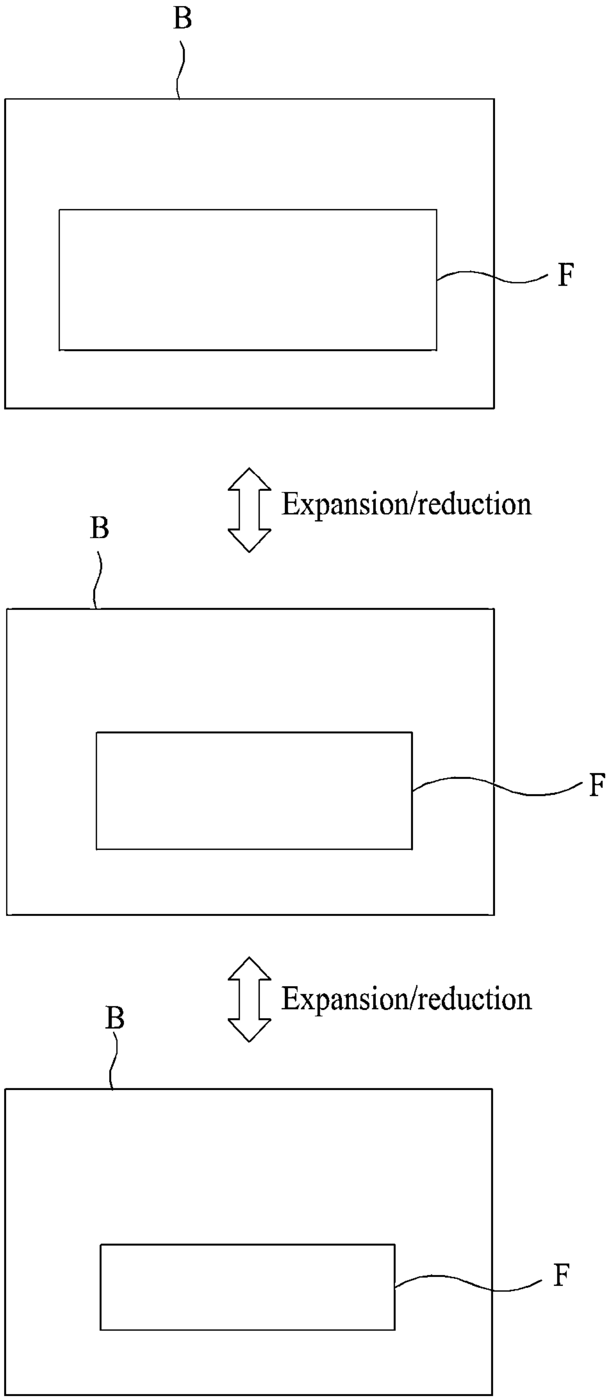
FIGS. 2A and 2B illustrate examples of describing a vehicle's speed-based operation characteristic of a digital rear mirror device of FIG. 1.
Figure 2B:
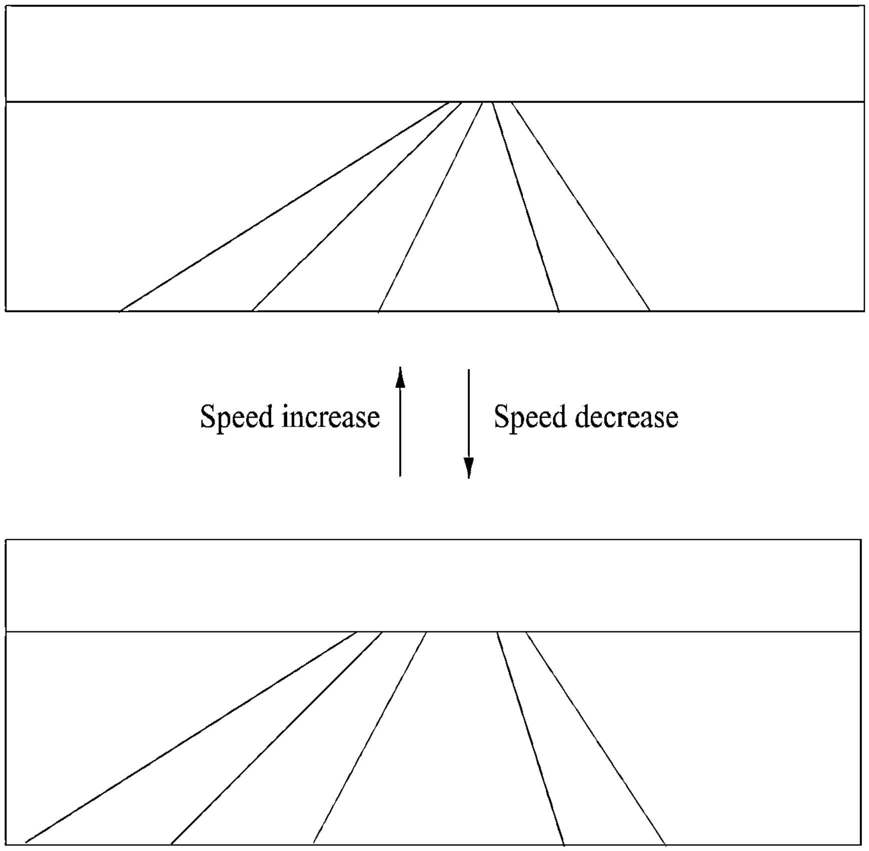
Figure 3A:
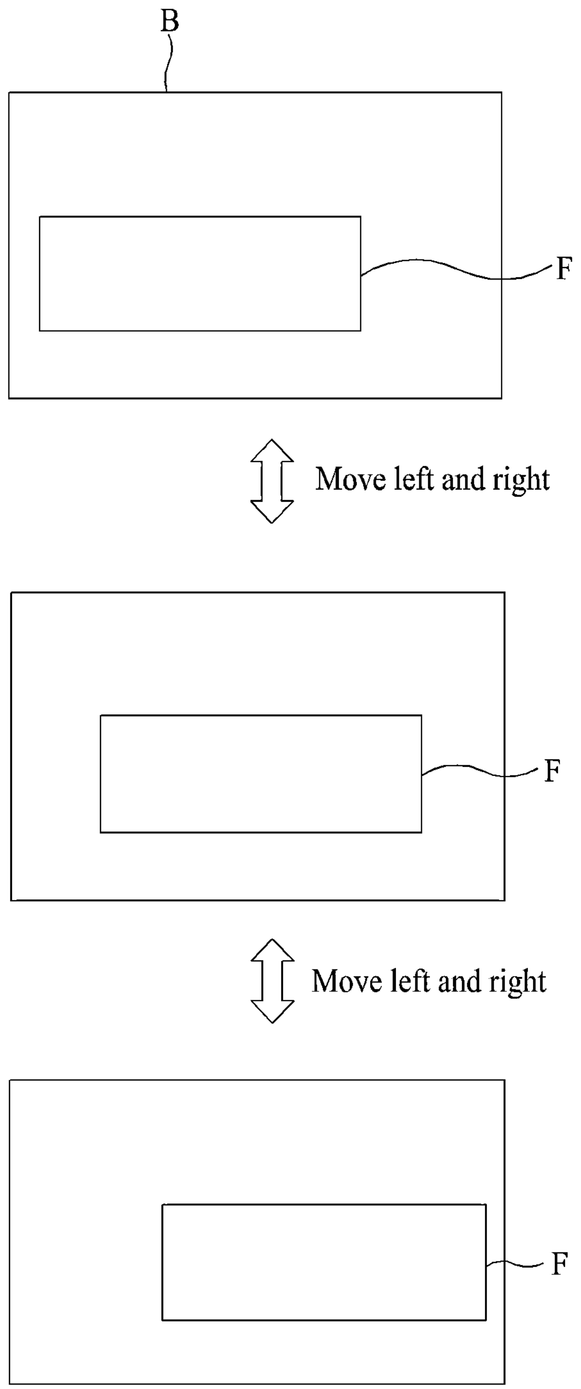
FIGS. 3A and 3B illustrate examples of describing a vehicle's steering-based operation characteristic of the digital rear mirror device of FIG. 1.
Figure 3B:
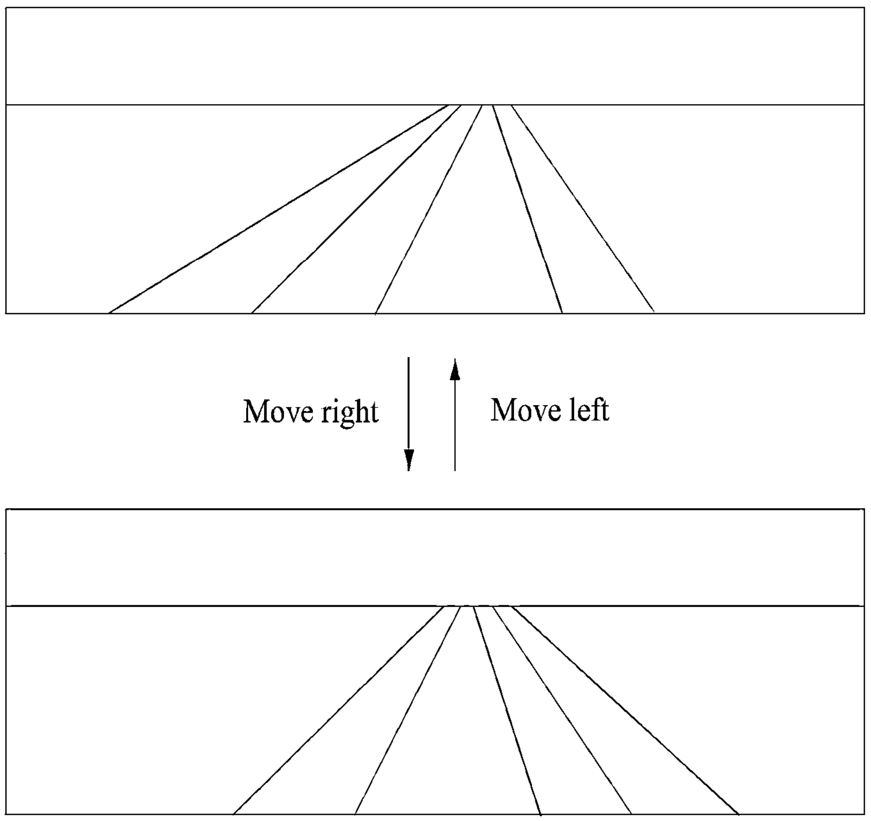
Figure 4A:
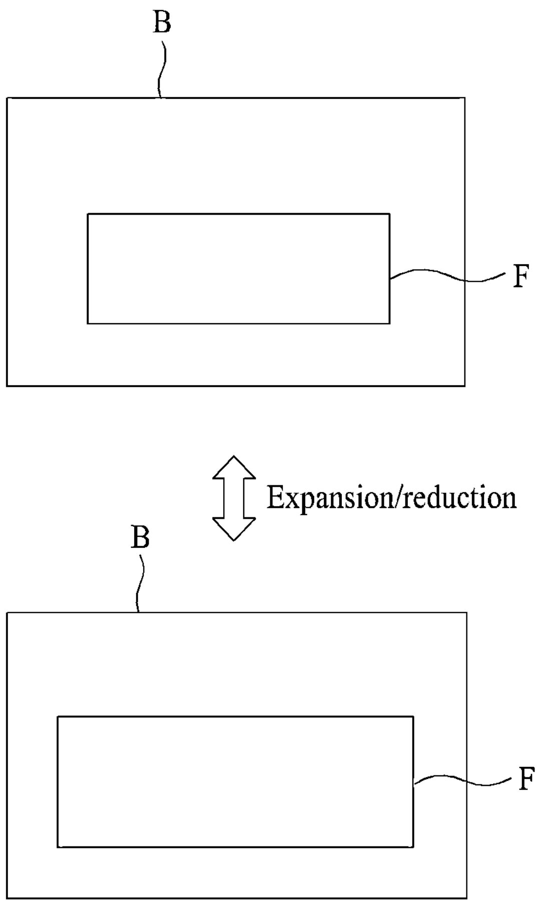
FIGS. 4A and 4B illustrate examples of describing a vehicle's reverse-based operation characteristic of the digital rear mirror device of FIG. 1.
Figure 4B:
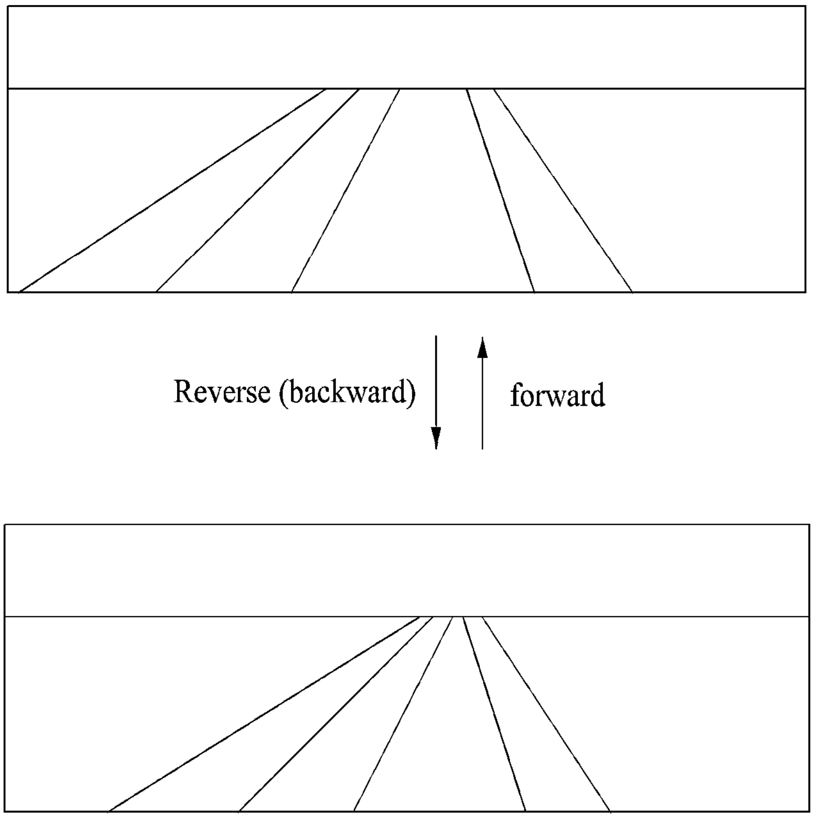
Figure 5A:
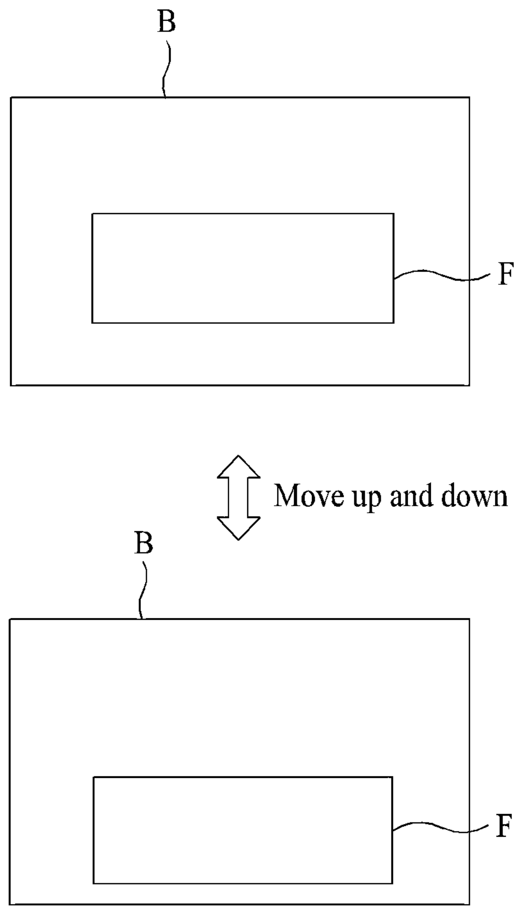
FIGS. 5A and 5B illustrate examples of describing the vehicle's reverse-based operation characteristic of the digital rear mirror device of FIG. 1.
Figure 5B:
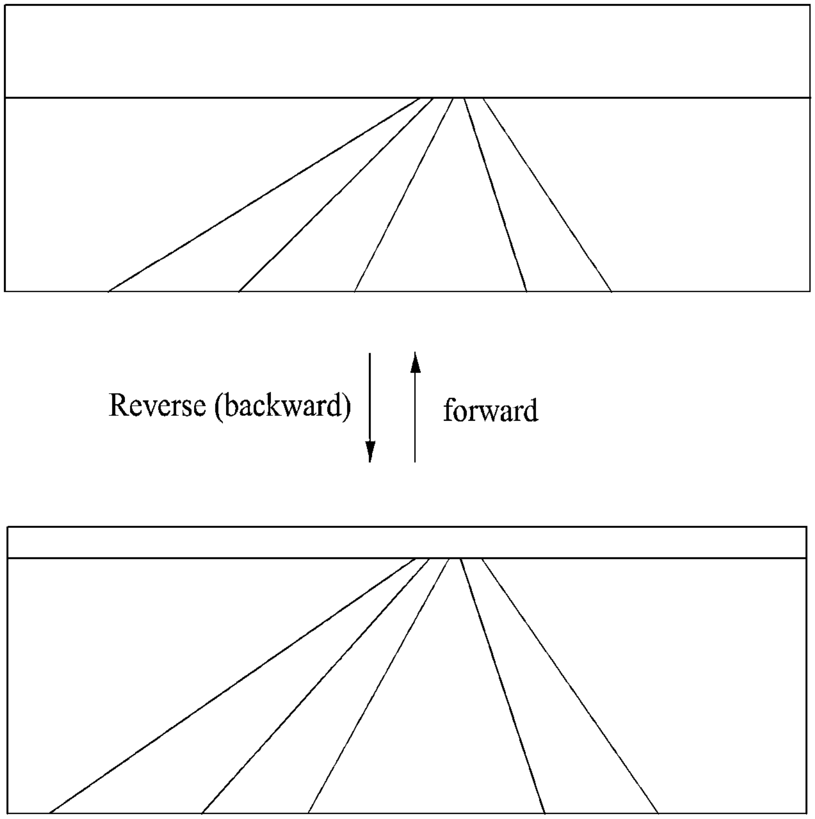

FIG. 1 is a block diagram illustrating a configuration of a digital rear mirror system 100 according to various example embodiments. FIGS. 2A and 2B illustrate examples of describing a vehicle's speed-based operation characteristic of a digital rear mirror device 120 of FIG. 1. FIGS. 3A and 3B illustrate examples of describing a vehicle's steering-based operation characteristic of the digital rear mirror device 120 of FIG. 1. FIGS. 4A and 4B illustrate examples of describing a vehicle's reverse-based operation characteristic of the digital rear mirror device 120 of FIG. 1. FIGS. 5A and 5B illustrate examples of describing the vehicle's reverse-based operation characteristic of the digital rear mirror device 120 of FIG. 1.

Referring to FIG. 1, the digital rear mirror system 100 may include a camera device 110 and the digital rear mirror device 120. The digital rear mirror system 100 may be mounted inside the vehicle, and may be configured to acquire video information on a surrounding environment of the vehicle through the camera device 110 and to output visual information through the digital rear mirror device 120 based on the video information. In some example embodiments, at least one another component (e.g., another camera device) may be added to the digital rear mirror system 100.

The camera device 110 and the digital rear mirror device 120 may be communicatively connected in a wired or wireless manner. In an example embodiment, the camera device 110 and the digital rear mirror device 120 may be connected through a communication cable. The camera device 110 and the digital rear mirror device 120 may communicate using a serial transmission method. However, without being limited thereto, the camera device 110 and the digital rear mirror device 120 may be connected through in-vehicle internal network communication (e.g., controller area network (CAN) communication). The camera device 110 and the digital rear mirror device 120 may include various communication chips.

A video captured by the camera device 110 may be a surrounding video of the vehicle. For example, the camera device 110 may acquire a rear view video of the vehicle. To this end, the camera device 110 may be mounted on the back of the vehicle to face the rear of the vehicle.

The digital rear mirror device 120 may provide the video captured by the camera device 110 to be displayed. The surrounding video acquired by the camera device 110 may be displayed on the digital rear mirror device 120 mounted inside the vehicle. For example, the rear view video of the vehicle acquired through the camera device 110 may be provided to the driver of the vehicle through the digital rear mirror device 120. To this end, the digital rear mirror device 120 may be provided within the driver's field of view. In detail, the digital rear mirror device 120 may be provided to display the rear view video. The digital rear mirror device 120 may have a display area of a predetermined size and may display the rear view video on the display area.

According to various example embodiments, the digital rear mirror device 120 may adjust the angle of view (F) for the rear view video to be displayed on the display area while driving the vehicle. In detail, the digital rear mirror device 120 may adjust the angle of view (F) based on driving information of the vehicle while driving the vehicle. The digital rear mirror device 120 may display the rear view video according to the adjusted angle of view (F). Here, the driving information may include at least one of speed information indicating a speed of the vehicle, steering information related to steering of the vehicle, and reverse information indicating whether the vehicle is reversing.

According to a first example embodiment, the digital rear mirror device 120 may adjust the angle of view (F) based on speed information. In more detail, as shown in FIG. 2A, the digital rear mirror device 120 may expand or reduce the angle of view (F) with respect to a background environment (B) based on a speed of the vehicle. Here, the background environment (B) refers to an environment behind the vehicle and at least a portion of the background environment (B) may be captured as a rear view video. Therefore, as shown in FIG. 2B, the digital rear mirror device 120 may display the rear view video according to the corresponding angle of view (F), providing the driver of the vehicle with rear view in various wide ranges. Here, if a speed of the vehicle increases to exceed a threshold, the digital rear mirror device 120 may expand the angle of view (F). In this case, the digital rear mirror device 120 may provide the overall wider range of rear view to the driver of the vehicle. Here, the threshold of the speed for expanding the angle of view (F) may be in the range of 80 km/h to 120 km/h. Meanwhile, if the speed of the vehicle decreases below the threshold, the digital rear mirror device 120 may reduce the angle of view (F). In this case, the digital rear mirror device 120 may provide the overall narrower range of rear view to the driver of the vehicle. Here, the threshold of the speed for reducing the angle of view (F) may be in the range of 20 km/h to 40 km/h.

Here, the digital rear mirror device 120 may compare the speed of the vehicle to at least one threshold and, to this end, may store registration information in which a plurality of speed ranges classified by the threshold and sizes of the angle of view (F) respectively corresponding thereto are mapped. Here, the registration information may be stored at the time of manufacturing the digital rear mirror device 120 and may be changed by a user. Therefore, the digital rear mirror device 120 may expand or reduce the angle of view (F) to a corresponding size by comparing the speed of the vehicle to the threshold and by selecting a size of the angle of view (F) corresponding to one of the speed ranges. For example, although FIG. 2A illustrates a case in which, in the digital rear mirror device 120, three speed ranges classified by two thresholds and sizes of the angle of view (F) respectively corresponding thereto are mapped, the present disclosure is not limited thereto.

According to a second example embodiment, the digital rear mirror device 120 may adjust the angle of view (F) based on steering information. In more detail, as shown in FIG. 3A, the digital rear mirror device 120 may move the center of the angle of view (F) left and right with respect to the background environment (B) based on a direction and an angle of steering of the vehicle. Accordingly, as shown in FIG. 3B, the digital rear mirror device 120 may display the rear view video according to the corresponding angle of view (F), providing the driver of the vehicle with the rear view in various location ranges. Here, the digital rear mirror device 120 may move the center of the angle of view (F) from the origin to a direction of steering by an angle of steering. In this case, the digital rear mirror device 120 may provide the driver of the vehicle with a wider range of rear view in the direction of steering, for example, to the right or to the left. For example, when the angle of steering is right (clockwise), the digital rear mirror device 120 may provide the wider range of rear view to the right by an angle corresponding to the angle of steering. For example, when the angle of steering is left (counterclockwise), the digital rear mirror device 120 may provide the wider range of rear view to the left by an angle corresponding to the angle of steering. Then, if the angle of steering decreases, the digital rear mirror device 120 may return the center of the angle of view (F) to the origin. In this case, the digital rear mirror device 120 may provide the driver of the vehicle with the same range of rear view to the right and to the left.

For example, when the vehicle changes its lane to the right lane, the digital rear mirror device 120 may provide the wider range of rear view to the right rear of the vehicle, and when the vehicle enters the corresponding lane, the digital rear mirror device 120 may provide the same range of rear view to the right rear and to the left rear of the vehicle. Similarly, when the vehicle changes its lane to the left lane, the digital rear mirror device 120 may provide the wider range of rear view to the left rear of the vehicle, and when the vehicle enters the corresponding lane, the digital rear mirror device 120 may provide the same range of rear view to the right rear and to the left rear of the vehicle.

According to a third example embodiment, the digital rear mirror device 120 may adjust the angle of view (F) based on steering information. In more detail, as shown in the FIG. 2A, the digital rear mirror device 120 may expand or reduce the angle of view (F) with respect to the background environment (B) based on the direction and the angle of steering of the vehicle. Accordingly, although not illustrated, the digital rear mirror device 120 may display the rear view video according to the corresponding angle of view (F), providing the driver of the vehicle with the rear view in various wide ranges. Here, if the angle of steering increases to exceed a threshold, the digital rear mirror device 120 may expand the angle of view (F). In this case, the digital rear mirror device 120 may provide the driver of the vehicle with the overall wider range of rear view, including the direction of steering. Then, if the angle of steering deceases below the threshold, the digital rear mirror device 120 may reduce the angle of view (F). In this case, the digital rear mirror device 120 may provide the overall narrower range of rear view to the driver of the vehicle.

According to a fourth example embodiment, the digital rear mirror device 120 may adjust the angle of view (F) based on reverse information. In more detail, as shown in FIG. 4A, the digital rear mirror device 120 may expand or reduce the angle of view (F) with respect to the background environment (B) depending on whether the vehicle is reversing. Accordingly, as shown in FIG. 4B, the digital rear mirror device 120 may display the rear view video according to the corresponding angle of view (F), providing the driver of the vehicle with the rear view video in various wide ranges. Here, when the vehicle is reversing, the digital rear mirror device 120 may expand the angle of view (F). In this case, the digital rear mirror device 120 may provide the driver of the vehicle with the overall wider range of rear view. This may help prevent an accident when the vehicle is reversing. Then, when the vehicle stops moving backward, for example, when the vehicle moves forward, the digital rear mirror device 120 may reduce the angle of view (F). In this case, the digital rear mirror device 120 may provide the overall narrower range of rear view to the driver of the vehicle.

According to a fifth example embodiment, the digital rear mirror device 120 may adjust the angle of view (F) based on reverse information. In more detail, as shown in FIG. 5A, the digital rear mirror device 120 may move the center of the angle of view (F) up and down with respect to the background environment (B) depending on whether the vehicle is reversing. Accordingly, as shown in FIG. 5B, the digital rear mirror device 120 may display the rear view video according to the corresponding angle of view (F), providing the driver of the vehicle with the rear view in various location ranges. Here, when the vehicle is reversing, the digital rear mirror device 120 may move the center of the angle of view (F) downward from the origin. In this case, the digital rear mirror device 120 may provide the driver of the vehicle with the wider range of rear view than the floor, for example, the ground. This may for example, help the driver of the vehicle easily park the vehicle. Then, when the vehicle stops moving backward, for example, when the vehicle moves forward, the digital rear mirror device 120 may return the center of the angle of view (F) to the origin.

According to additional example embodiments, the digital rear mirror device 120 may adjust the angle of view (F) based on combination of at least two of speed information, steering information, and reverse information. In an example embodiment, if a speed of the vehicle exceeds a first threshold and an angle of steering increases to exceed a second threshold, the digital rear mirror device 120 may expand the angle of view (F). Then, if the angle of steering decreases below the second threshold, the digital rear mirror device 120 may reduce the angle of view (F). Alternatively, if the speed of the vehicle decreases below the first threshold and the angle of steering decreases below the second threshold, the digital rear mirror device 120 may reduce the angle of view (F). In another example embodiment, if the speed of the vehicle exceeds the first threshold and the vehicle is reversing, the digital rear mirror device 120 may expand the angle of view (F). Then, if the speed of the vehicle decreases below the first threshold or if the vehicle stops moving backward, for example, if the vehicle is moving forward, the digital rear mirror device 120 may reduce the angle of view (F). In still another example embodiment, if the speed of the vehicle is below the first threshold and the vehicle is reversing, the digital rear mirror device 120 may move the center of the angle of view (F) downward from the origin. Then, if the speed of the vehicle decreases below the first threshold, or if the vehicle stops moving backward, for example, if the vehicle is moving forward, the digital rear mirror device 120 may return the center of the angle of view (F) to the origin. Other example embodiments are also possible.

According to some example embodiments, the camera device 110 and the digital rear mirror device 120 may communicate through a serial transmission method. In this case, the camera device 110 may include a serializer and the digital rear mirror device 120 may include a deserializer. The serializer may perform two-way communication with the deserializer. Here, a first channel from the serializer to the deserializer and a second channel (which may also be referred to as backchannel) from the deserializer to the serializer may be present between the serializer and the deserializer. Through the first channel, the rear view video may be transmitted. Here, the serializer may convert the rear view video from parallel data to serial data, and the deserializer may convert the rear view video from serial data to parallel data.

Figure 6:
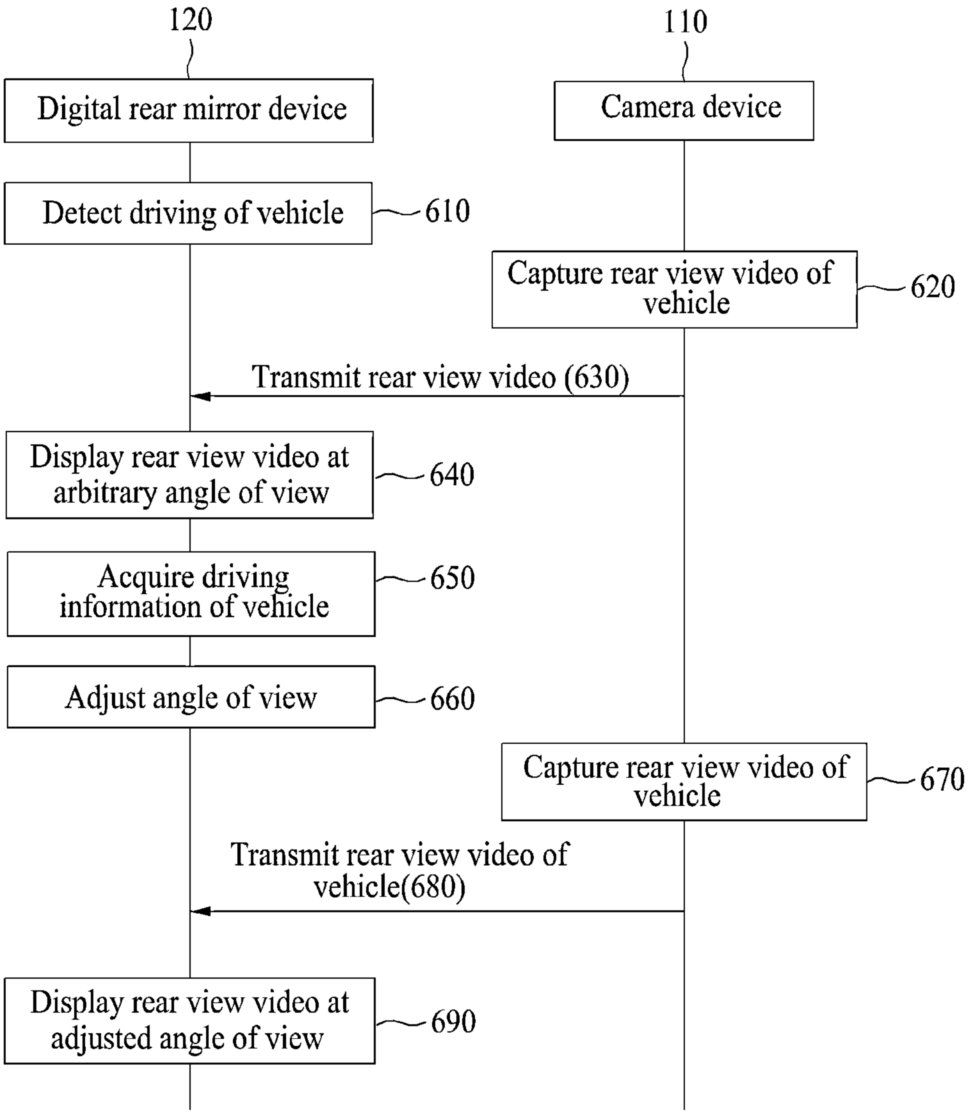
FIG. 6 is a flowchart illustrating an operating method of a digital rear mirror system according to various example embodiments.

FIG. 6 is a flowchart illustrating an operating method of the digital rear mirror system 100 according to various example embodiments.

Referring to FIG. 6, in operation 610, the digital rear mirror device 120 may detect driving of a vehicle. In an example embodiment, the digital rear mirror device 120 may detect driving of the vehicle through controller area network (CAN) data from the vehicle. In another example embodiment, the digital rear mirror device 120 may operate with power supplied from the vehicle and may detect driving of the vehicle.

Then, while driving the vehicle, the camera device 110 may capture a rear view video of the vehicle in operation 620. Then, in operation 630, the camera device 110 may transmit the rear view video to the digital rear mirror device 120. That is, the digital rear mirror device 120 may receive the rear view video from the camera device 110. In operation 640, the digital rear mirror device 120 may display the rear view video at arbitrary angle of view (F).

In an example embodiment, configuration information on the angle of view (F) may be stored in the digital rear mirror device 120. In this case, the digital rear mirror device 120 may detect a portion of the rear view video according to the angle of view (F) and may display the detected portion on a display area. In another example embodiment, the camera device 110 may be implemented to have a variable focal distance and may be set to capture the rear view video according to the angle of view (F) at one focal distance. For example, the camera device 110 may have a variable focal lens. In this case, the digital rear mirror device 120 may display the rear view video as is on the display area. In still another example embodiment, configuration information on the angle of view (F) may be stored in the camera device 110. In this case, the camera device 110 may detect a portion of the rear view video according to the angle of view (F) and the digital rear mirror device 120 may display the detected portion as is on the display area.

While driving the vehicle, the digital rear mirror device 120 may acquire driving information of the vehicle in operation 650. Here, the driving information may include at least one of speed information indicating a speed of the vehicle, steering information related to steering of the vehicle, and reverse information indicating whether the vehicle is reversing. In an example embodiment, the digital rear mirror device 120 may acquire at least a portion of the driving information from CAN data from the vehicle. In another example embodiment, the digital rear mirror device 120 may acquire the speed information by computing the speed of the vehicle using location information of the vehicle.

Then, in operation 660, the digital rear mirror device 120 may adjust the angle of view (F) for the rear view video based on the driving information. According to the first example embodiment, the digital rear mirror device 120 may expand or reduce the angle of view (F) based on the speed of the vehicle. According to the second example embodiment, the digital rear mirror device 120 may move the center of the angle of view (F) to the left or to the right based on the direction and the angle of steering of the vehicle. According to the third example embodiment, the digital rear mirror device 120 may expand or reduce the center of the angle of view (F) based on the direction and the angle of steering of the vehicle. According to the fourth example embodiment, the digital rear mirror device 120 may expand or reduce the angle of view (F) with respect to the background environment (B) depending on whether the vehicle is reversing. According to the fifth example embodiment, the digital rear mirror device 120 may move the center of the angle of view (F) up and down with respect to the background environment (B) depending on whether the vehicle is reversing. Other example embodiments are also possible.

In an example embodiment, the digital rear mirror device 120 may update configuration information with the adjusted angle of view (F). In another example embodiment, the digital rear mirror device 120 may control the camera device 110 to capture the rear view video according to the angle of view (F) adjusted through focal distance adjustment. In still another example embodiment, the digital rear mirror device 120 may transmit the adjusted angle of view (F) to the camera device 110, and the camera device 110 may update the configuration information with the adjusted angle of view (F).

Then, while driving the vehicle, the camera device 110 may capture the rear view video of the vehicle in operation 670. Then, in operation 680, the camera device 110 may transmit the rear view video to the digital rear mirror device 120. That is, the digital rear mirror device 120 may receive the rear view video from the camera device 110. Accordingly, in operation 690, the digital rear mirror device 120 may display the rear view video at the adjusted angle of view (F). In an example embodiment, configuration information on the angle of view (F) may be stored in the digital rear mirror device 120. In this case, the digital rear mirror device 120 may detect a portion of the rear view video according to the angle of view (F) and may display the detected portion on the display area. In another example embodiment, the camera device 110 may be set to capture the rear view video according to the angle of view (F). In this case, the digital rear mirror device 120 may display the rear view video as is on the display area. In still another example embodiment, configuration information on the angle of view (F) may be stored in the camera device 110. In this case, the camera device 110 may detect a portion of the rear view video according to the angle of view (F), and the digital rear mirror device 120 may display the detected portion as is on the display area.

Figure 7:
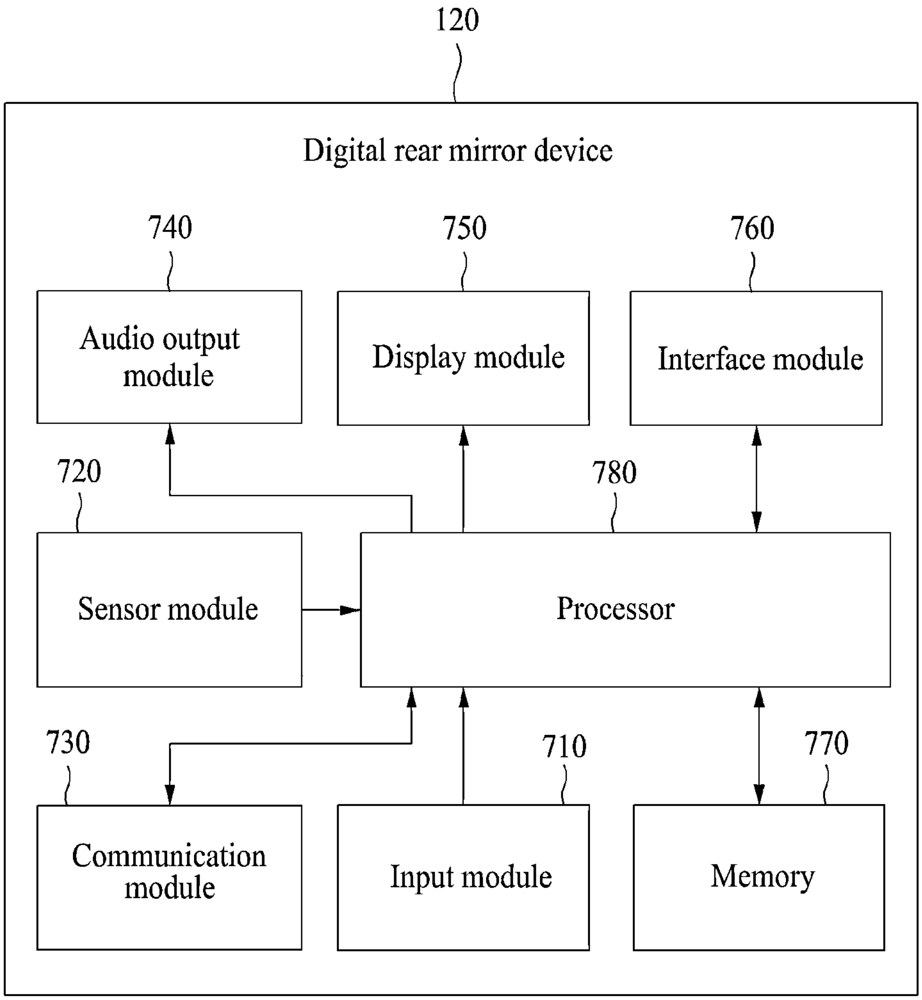
FIG. 7 is a block diagram illustrating an internal configuration of a digital rear mirror device according to various example embodiments.

FIG. 7 is a block diagram illustrating an internal configuration of the digital rear mirror device 120 according to various example embodiments.

Referring to FIG. 7, the digital rear mirror device 120 may be mounted to a vehicle with the camera device 110, and may be communicatively connected to the vehicle and the camera device 110. In detail, the digital rear mirror device 120 may include at least one of an input module 710, a sensor module 720, a communication module 730, an audio output module 740, a display module 750, an interface module 760, a memory 770, and a processor 780. In some example embodiments, at least one of components of the digital rear mirror device 120 may be omitted and at least one another component may be added. In some example embodiments, at least two of the components of the digital rear mirror device 120 may be integrated into a single circuit. In an example embodiment, all components of the digital rear mirror device 120 may be accommodated within a single housing. In this case, the housing may be provided at the front of the vehicle, particularly, in front of a driver's seat in interior space in the case of the vehicle with the interior space. That is, the digital rear mirror device 120 may be provided at a location of a general rear mirror. In another example embodiment, only the display module 750 may be accommodated within a single housing, or the display module 750 and at least one another component (e.g., input module 710 and sensor module 720) may be accommodated within a single housing. In this case, the housing may be provided at the front of the vehicle, particularly, in front of the driver's seat in the inner space in the case of the vehicle with the inner space. That is, the display module 750 may be provided at the location of the general rear mirror. Meanwhile, a remaining component may be provided at a separate location of the vehicle.

The input module 710 may input a signal to be used for at least one component of the digital rear mirror device 120. For example, the input module 710 may include at least one of a key, a button, a keyboard, a keypad, a mouse, a joystick, and a microphone. In some example embodiments, the input module 710 may include at least one of a touch circuitry configured to detect a touch and a sensor circuitry configured to measure strength of force generated by touch.

The sensor module 720 may generate an electrical signal or a data value corresponding to an internal operation state (e.g., power or temperature) of the digital rear mirror device 120 or an external environmental state. For example, the sensor module 720 may include at least one of a radar sensor, a light detection and ranging (LIDAR) sensor, a motion sensor, a gesture sensor, a gyro sensor, a barometric pressure sensor, a magnetic sensor, an acceleration sensor, a grip sensor, a proximity sensor, a color sensor, an infrared (IR) sensor, a biosignal sensor, a temperature sensor, a humidity sensor, and an illuminance sensor.

The communication module 730 may communicate with an external device. The communication module 730 may establish a communication channel between the digital rear mirror device 120 and the external device and may communicate with the external device through the communication channel. Here, the external device may include at least one of a satellite, a base station, a server, and another electronic device. The communication module 730 may include at least one of a wired communication module and a wireless communication module. The wired communication module may be connected to the external device in a wired manner and may communicate with the external device in the wired manner through a connection terminal. The wireless communication module may include at least one of a near field communication module and a far field communication module. The near field communication module may communicate with the external device using a near field communication scheme. For example, the near field communication scheme may include at least one of Bluetooth, wireless fidelity (WiFi) direct, and infrared data association (IrDA). The far field communication module may communicate with the external device using a far field communication scheme. Here, the far field communication module may communicate with the external device over a network. For example, the network may include at least one of a cellular network, the Internet, and a computer network such as a local area network (LAN) and a wide area network (WAN).

According to various example embodiments, at least one of the input module 710, the sensor module 720, and the communication module 730 may generate a user input. For example, the user input may include at least one of a key (e.g., hard key or soft key) input and a voice input. In an example embodiment, the input module 710 or an arbitrary sensor of the sensor module 720 may generate the user input based on a signal that is directly input from the user. For example, at least one of a motion sensor, a gesture sensor, a proximity sensor, a temperature sensor, an illuminance sensor may be used for the user input. In another example embodiment, the communication module 730 may generate the user input based on a signal that is input from another electronic device used by the user.

The audio output module 740 may output an audio signal that is generated from the digital rear mirror device 120. For example, the audio output module 740 may include at least one of a speaker and a receiver.

The display module 750 may be provided to display a rear view video of the vehicle. To this end, the display module 750 may have a display area with a predetermined size. For example, the display module 750 may include at least one of a display, a hologram device, and a projector. For example, the display module 750 may be implemented as a touch screen by being assembled with at least one of a touch circuitry and a sensor circuitry of the input module 110. According to various example embodiments, the display module 750 may be provided at the front of the vehicle, particularly, in front of the driver's seat in the inner space in the case of the vehicle with the inner space. That is, the display module 750 may be provided at the location of the general rear mirror. Additionally, the display module 750 may further include another display area provided around the display area for the rear view video.

The interface module 760 may be provided for connection to an external device. In detail, the interface module 760 may support a designated protocol connectable to the external device in a wired or wireless manner. According to some example embodiments, the interface module 760 may communicate with the external device through a serial transmission method. Here, the external device may include at least one of the vehicle and the camera device 110. When the digital rear mirror system 100 further includes another camera device, the external device may also include the other camera device. In this case, the interface module 760 may include a deserializer. The deserializer may perform two-way communication with the serializer of the camera device 110. Here, a first channel from the serializer to the deserializer and a second channel (which may also be referred to as backchannel) from the deserializer to the serializer may be present between the serializer and the deserializer.

The memory 770 may store a variety of data used by at least one component of the digital rear mirror device 120. For example, the memory 770 may include at least one of a volatile memory and a non-volatile memory. Data may include at least one program and input data or output data related thereto. The program may be stored in the memory 770 as software including at least one instruction, and, for example, may include at least one of an operating system (OS), middleware, and an application.

The processor 780 may control at least one component of the digital rear mirror device 120 by executing the program of the memory 770. Through this, the processor 780 may perform data processing or operations. Here, the processor 780 may execute instructions stored in the memory 770.

According to various example embodiments, the processor 780 may adjust the angle of view (F) for the rear view video to be displayed on the display area of the display module 750 while driving the vehicle. In detail, the processor 780 may adjust the angle of view (F) based on driving information of the vehicle while driving the vehicle and, through this, may display the rear view video on the display area of the display module 750 according to the corresponding angle of view (F). Here, the driving information may include at least one of speed information indicating a speed of the vehicle, steering information related to steering of the vehicle, and reverse information indicating whether the vehicle is reversing.

According to the first example embodiment, the processor 780 may adjust the angle of view (F) based on speed information. In more detail, as shown in FIG. 2A, the processor 780 may expand or reduce the angle of view (F) with respect to the background environment (B) based on the speed of the vehicle. Therefore, as shown in FIG. 2B, the processor 780 may display the rear view video on the display module 750 according to the corresponding angle of view (F), providing the driver of the vehicle with rear view in various wide ranges. Here, if a speed of the vehicle increases to exceed a threshold, the processor 780 may expand the angle of view (F). In this case, the, processor 780 may provide the overall wider range of rear view to the driver of the vehicle. Here, the threshold of the speed for expanding the angle of view (F) may be in the range of 80 km/h to 120 km/h. Meanwhile, if the speed of the vehicle decreases below the threshold, the processor 780 may reduce the angle of view (F). In this case, the processor 780 may provide the overall narrower range of rear view to the driver of the vehicle. Here, the threshold of the speed for reducing the angle of view (F) may be in the range of 20 km/h to 40 km/h.

Here, the processor 780 may compare the speed of the vehicle to at least one threshold and, to this end, the memory 770 may store registration information in which a plurality of speed ranges classified by the threshold and sizes of the angle of view (F) respectively corresponding thereto are mapped. Here, the registration information may be stored in the memory 770 at the time of manufacturing the processor 780, and the processor 780 may change the registration information in the memory 770 based on the user input. Therefore, the processor 780 may expand or reduce the angle of view (F) to a corresponding size by comparing the speed of the vehicle to the threshold and by selecting a size of the angle of view (F) corresponding to one of the speed ranges. For example, although FIG. 2A illustrates a case in which, in the processor 780, three speed ranges classified by two thresholds and sizes of the angle of view (F) respectively corresponding thereto are mapped, it is not limited thereto.

According to the second example embodiment, the processor 780 may adjust the angle of view (F) based on steering information. In more detail, as shown in FIG. 3A, the processor 780 may move the center of the angle of view (F) left and right with respect to the background environment (B) based on a direction and an angle of steering of the vehicle. Accordingly, as shown in FIG. 3B, the processor 780 may display the rear view video on the display module 750 according to the corresponding angle of view (F), providing the driver of the vehicle with rear view in various location ranges. Here, the processor 780 may move the center of the angle of view (F) from the origin to the direction of steering by the angle of steering. In this case, the processor 780 may provide the driver of the vehicle with a wider range of rear view in the direction of steering, for example, to the right or to the left. For example, when the angle of steering is right (clockwise), the processor 780 may provide the wider range of rear view to the right by an angle corresponding to the angle of steering. For example, when the angle of steering is left (counterclockwise), the processor 780 may provide the wider range of rear view to the left by an angle corresponding to the angle of steering. Then, if the angle of steering is returned, the processor 780 may return the center of the angle of view (F) to the origin. In this case, the processor 780 may provide the driver of the vehicle with the same range of rear view to the right and to the left.

For example, when the vehicle changes its lane to the right lane, the processor 780 may provide the wider range of rear view to the right rear of the vehicle, and when the vehicle enters the corresponding lane, the processor 780 may provide the same range of rear view to the right rear and to the left rear of the vehicle. Similarly, when the vehicle changes its lane to the left lane, the processor 780 may provide the wider range of rear view to the left rear of the vehicle, and when the vehicle enters the corresponding lane, the processor 780 may provide the same range of rear view to the right rear and to the left rear of the vehicle.

According to the third example embodiment, the processor 780 may adjust the angle of view (F) based on steering information. In more detail, as shown in FIG. 2A, the processor 780 may expand or reduce the angle of view (F) with respect to the background environment (B) based on the direction and the angle of steering of the vehicle. Accordingly, although not illustrated, the processor 780 may display the rear view video on the display module 750 according to the corresponding angle of view (F), providing the driver of the vehicle with the rear view in various wide ranges. Here, if the angle of steering increases to exceed a threshold, the processor 780 may expand the angle of view (F). In this case, the processor 780 may provide the driver of the vehicle with the overall wider range of rear view, including the direction of steering. Then, if the angle of steering deceases below the threshold, the processor 780 may reduce the angle of view (F). In this case, the processor 780 may provide the overall narrower range of rear view to the driver of the vehicle.

According to the fourth example embodiment, the processor 780 may adjust the angle of view (F) based on reverse information. In more detail, as shown in FIG. 4A, the processor 780 may expand or reduce the angle of view (F) with respect to the background environment (B) depending on whether the vehicle is reversing. Accordingly, as shown in FIG. 4B, the processor 780 may display the rear view video on the display module 750 according to the corresponding angle of view (F), providing the driver of the vehicle with the rear view video in various wide ranges. Here, when the vehicle is reversing, the processor 780 may expand the angle of view (F). In this case, the processor 780 may provide the driver of the vehicle with the overall wider range of rear view. This may help prevent an accident when the vehicle is reversing. Then, when the vehicle stops moving backward, for example, when the vehicle moves forward, the processor 780 may reduce the angle of view (F). In this case, the processor 780 may provide the overall narrower range of rear view to the driver of the vehicle.

According to the fifth example embodiment, the processor 780 may adjust the angle of view (F) based on reverse information. In more detail, as shown in FIG. 5A, the processor 780 may move the center of the angle of view (F) up and down with respect to the background environment (B) depending on whether the vehicle is reversing. Accordingly, as shown in FIG. 5B, the processor 780 may display the rear view video on the display module 750 according to the corresponding angle of view (F), providing the driver of the vehicle with the rear view in various location ranges. Here, when the vehicle is reversing, the processor 780 may move the center of the angle of view (F) downward from the origin. In this case, the processor 780 may provide the driver of the vehicle with the wider range of rear view than the floor, for example, the ground. This may for example, help the driver of the vehicle easily park the vehicle. Then, when the vehicle stops moving backward, for example, when the vehicle moves forward, the processor 780 may return the center of the angle of view (F) to the origin.

According to additional example embodiments, the processor 780 may adjust the angle of view (F) based on combination of at least two of speed information, steering information, and reverse information. In an example embodiment, if a speed of the vehicle exceeds a first threshold and an angle of steering increases to exceed a second threshold, the processor 780 may expand the angle of view (F). Then, if the angle of steering decreases below the second threshold, the processor 780 may reduce the angle of view (F). Alternatively, if the speed of the vehicle decreases below the first threshold and the angle of steering decreases below the second threshold, the processor 780 may reduce the angle of view (F). In another example embodiment, if the speed of the vehicle is below the first threshold and the vehicle is reversing, the processor 780 may expand the angle of view (F). Then, if the speed of the vehicle decreases below the first threshold, or if the vehicle stops moving backward, for example, if the vehicle is moving forward, the processor 780 may reduce the angle of view (F). In still another example embodiment, if the speed of the vehicle is below the first threshold and the vehicle is reversing, the processor 780 may move the center of the angle of view (F) downward from the origin. Then, if the speed of the vehicle decreases below the first threshold, or if the vehicle stops moving backward, for example, if the vehicle is moving forward, the processor 780 may return the center of the angle of view (F) to the origin. Other example embodiments are also possible.

Additionally, the processor 780 may detect reference information by analyzing the rear view video and may display the reference information with the rear view video. The reference information may be information within the rear view video, for example, a road sign, and may be information derived from the rear view video, for example, a distance from an adjacent vehicle and a speed of the adjacent vehicle. For example, the processor 780 may display the rear view video and the reference information on the display area of the display module 750. As another example, the processor 780 may display the reference information on another display area of the display module 750 while displaying the rear view video on the display area of the display module 750. Here, the reference information may be displayed using various graphical representations, for example, text, symbol, and image.

Additionally, the processor 780 may adjust the display module 750 or may control the camera device 110 using a sensing input that is input through the sensor module 720. For example, the processor 780 may detect the sensing input indicating ambient brightness, which is input through an illuminance sensor. In this case, the processor 780 may change at least one of the brightness and reflectance of the display module 750 using the sensing input. Alternatively, the processor 780 may change photosensitivity of the camera device 110 or brightness of the captured rear view video based on the sensing input. Here, the processor 780 may determine a target value for the photosensitivity of the camera device 110 or the brightness of the rear view video, and may transmit the target value to the camera device 110 or may transmit the sensing input to the camera device 110.

Figure 8:
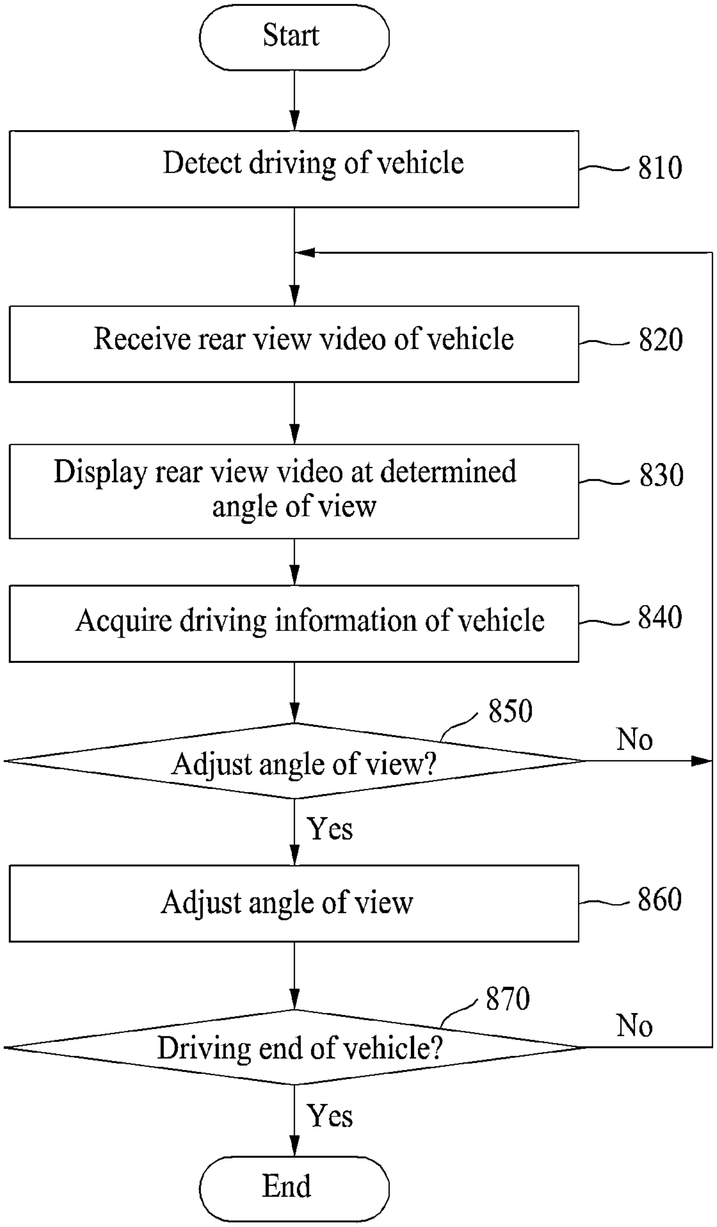
FIG. 8 is a flowchart illustrating an operating method of a digital rear mirror device according to various example embodiments.

FIG. 8 is a flowchart illustrating an operating method of the digital rear mirror device 120 according to various example embodiments.

Referring to FIG. 8, in operation 810, the digital rear mirror device 120 may detect driving of a vehicle. In an example embodiment, CAN data may be received from the vehicle through the interface module 760 and, through this, the processor 780 may detect driving of the vehicle. In another example embodiment, processor 780 may operate with power supplied from the vehicle and may detect driving of the vehicle.

Then, while driving the vehicle, the digital rear mirror device 120 may receive a rear view video of the vehicle from the camera device 110 in operation 820. In detail, the camera device 110 may capture the rear view video and may transmit the rear view video to the digital rear mirror device 120. Accordingly, the processor 780 may receive the rear view video from the camera device 110 through the interface module 760. In some example embodiments, the rear view video may be transmitted through the first channel between the serializer of the camera device 110 and the deserializer of the interface module 760. Here, the serializer of the camera device 110 may convert the rear view video from parallel data to serial data, and the deserializer of the interface module 760 may convert the rear view video from serial data to parallel data. In some example embodiments, the processor 780 may store the rear view video in the memory 770. Then, in operation 830, the digital rear mirror device 120 may display the rear view video at the predetermined angle of view (F). In detail, the processor 780 may display the rear view video on the display module 750 at the predetermined angle of view.

In an example embodiment, configuration information on the angle of view (F) may be stored in the memory 770. In this case, the processor 780 may detect a portion of the rear view video according to the angle of view (F) and may display the detected portion on the display area of the display module 750. Here, the processor 780 may resize the detected portion in correspondence to the display area of the display module 750. In another example embodiment, the camera device 110 may be implemented to have a variable focal distance and may be set to capture the rear view video according to the angle of view (F) at one focal distance. For example, the camera device 110 may have a variable focal lens. In this case, the processor 780 may display the rear view video as is on the display area of the display module 750. Here, the processor 780 may resize the rear view video in correspondence to the display area of the display module 750. In still another example embodiment, configuration information on the angle of view (F) may be stored in the camera device 110. In this case, the camera device 110 may detect a portion of the rear view video according to the angle of view (F) and may transmit the same to the digital rear mirror device 120, and the processor 780 may display the detected portion as is on the display area of the display module 750. Here, the processor 780 may resize the detected portion in correspondence to the display area of the display module 750.

While driving the vehicle, the digital rear mirror device 120 may acquire driving information of the vehicle in operation 840. Here, the driving information may include at least one of speed information indicating a speed of the vehicle, steering information related to steering of the vehicle, and reverse information indicating whether the vehicle is reversing. In an example embodiment, the processor 780 may receive CAN data from the vehicle through the interface module 760 and may acquire at least a portion of the driving information from the CAN data. In another example embodiment, the processor 780 may acquire speed information using location information of the vehicle. For example, the processor 780 may receive location information of the vehicle through the communication module 730, and the location information may include global navigation satellite system (GNSS) information. For example, the GNSS information may include global positioning system (GPS) information. Through this, the processor 780 may acquire speed information by computing the speed of the vehicle using the location information.

Then, in operation 850, the digital rear mirror device 120 may determine whether to adjust the angle of view (F) for the rear view video based on the driving information. In detail, the processor 780 may determine whether to adjust the angle of view (F) for the rear view video depending on whether the driving information meets a predetermined condition. According to the first example embodiment, the processor 780 may compare the speed of the vehicle to at least one threshold. Here, the processor 780 may verify whether the speed of the vehicle increases to exceed the threshold, or may verify whether the speed of the vehicle decreases below the threshold. According to the second example embodiment and the third example embodiment, the processor 780 may compare the angle of steering of the vehicle to at least one threshold. Here, the processor 780 may verify whether the angle of steering increases to exceed the threshold, or may verify whether the angle of steering decreases below the threshold. According to the fourth example embodiment and the fifth example embodiment, the processor 780 may determine whether the vehicle is reversing.

When it is determined that the angle of view (F) does not need to be adjusted in operation 850, the digital rear mirror device 120 may repeat operations 820 to 850. In detail, if the driving information does not meet the predetermined condition, the processor 780 may maintain the previously determined angle of view (F) and may operate at the determined angle of view (F). That is, the processor 780 may receive the rear view video from the camera device 110 and may acquire the driving information of the vehicle while displaying the rear view video at the previously determined angle of view (F).

Meanwhile, when it is determined that the angle of view (F) needs to be adjusted in operation 850, the digital rear mirror device 120 may adjust the angle of view (F) for the rear view video in operation 860. In detail, the processor 780 may expand or reduce the angle of view (F), and may move the center of the angle of view (F) left and right or up and down. According to the first example embodiment, the processor 780 may expand the angle of view (F) if the speed of the vehicle increases to exceed the threshold and may reduce the angle of view (F) if the speed of the vehicle decreases below the threshold. According to the second example embodiment, the processor 780 may move the center of the angle of view (F) from the origin to the direction of steering if the angle of steering increases to exceed the threshold, and may return the center of the angle of view (F) to the origin if the angle of steering decreases below the threshold. According to the third example embodiment, the processor 780 may expand the angle of view (F) if the angle of steering increase to exceed the threshold, and may reduce the angle of view (F) if the angle of steering decreases below the threshold. According to the fourth example embodiment, the processor 780 may expand the angle of view (F) while the vehicle is reversing, and may reduce the angle of view (F) when the vehicle stops moving backward, for example, when the vehicle moves forward. According to the fifth example embodiment, the processor 780 may move the center of the angle of view (F) downward from the origin when the vehicle is reversing, and may return the center of the angle of view (F) to the origin when the vehicle stops moving backward, for example, when the vehicle moves forward. Other example embodiments are also possible.

In an example embodiment, the processor 780 may update configuration information with the adjusted angle of view (F). In another example embodiment, the processor 780 may control the camera device 110 to capture the rear view video according to the angle of view (F) adjusted through focal distance adjustment. Here, the processor 780 may transmit a control signal of the camera device 110 through the second channel between the serializer of the camera device 110 and the deserializer of the interface module 760. In still another example embodiment, the processor 780 may transmit the adjusted angle of view (F) to the camera device 110, and the camera device 110 may update configuration information with the adjusted angle of view (F). Here, the processor 780 may transmit the adjusted angle of view (F) to the camera device 110 through the second channel between the serializer of the camera device 110 and the deserializer of the interface module 760.

Then, when driving end of the vehicle is not detected in operation 870, the digital rear mirror device 120 may repeat at least a portion of operations 820 to 870. In detail, the processor 780 may be adjusted to operate with the newly determined angle of view (F). That is, the processor 780 may receive the rear view video from the camera device 110 and may acquire driving information of the vehicle while displaying the rear view video at the determined angle of view (F). Then, the processor 780 may maintain or further adjust the determined angle of view (F) based on the driving information. In this manner, the digital rear mirror device 120 may repeat at least a portion of operations 820 to 870 until driving end of the vehicle is detected in operation 870.

Meanwhile, when driving end of the vehicle is detected in operation 870, the digital rear mirror device 120 may terminate its operation. In an example embodiment, when CAN data is received from the vehicle through the interface module 760, the processor 780 may detect driving end of the vehicle from the CAN data. In another example embodiment, when CAN data is no longer received from the vehicle through the interface module 760, the processor 780 may detect driving end of the vehicle. In still another example embodiment, when power is no longer supplied from the vehicle, the processor 780 may detect driving end of the vehicle.

According to various example embodiments, since the digital rear mirror device 120 displays the rear view video of the vehicle captured by the camera device 110, an unobstructed rear view may be provided to the driver of the vehicle. In particular, the digital rear mirror device 120 may flexibly adjust the angle of view (F) for the rear view video based on driving information of the vehicle, helping the driver safely drive the vehicle when driving the vehicle. That is, the digital rear mirror device 120 may automatically provide the rear view necessary for the driver to drive the vehicle depending on a driving state of the vehicle. For example, the digital rear mirror device 120 may adjust the angle of view (F) when the vehicle changes a speed, changes a lane, or reverses. According to an example embodiment, when the digital rear mirror device 120 detects a portion of the rear view video according to the angle of view (F), the camera device 110 may transmit the captured rear view video and thus, a typical camera device may be used without modification. According to another example embodiment, when the camera device 110 is implemented to be capable of adjusting the angle of view through focal length adjustment, the camera device 110 may transmit the captured rear view video as is once set. According to still another example embodiment, when the camera device 110 detects a portion of the rear view video according to the angle of view (F), only the detected portion may be transmitted from the camera device 110 and thus, transmission load between the digital rear mirror device 120 and the camera device 110 may be reduced.

In short, the present disclosure provides the digital rear mirror device 120 capable of adjusting the angle of view (F) while driving a vehicle and an operating method of the same.

In the present disclosure, the digital rear mirror device 120 of a vehicle may include the display module 750 configured to display a rear view video of the vehicle and the processor 780 configured to connect to the display module 750 and to acquire driving information of the vehicle while driving the vehicle, and to adjust the angle of view (F) for the rear view video based on the driving information.

According to various example embodiments, the driving information may include at least one of speed information indicating a speed of the vehicle, steering information related to steering of the vehicle, and reverse information indicating whether the vehicle is reversing.

According to the first example embodiment, the processor 780 may be configured to expand the angle of view (F) if the speed increases to exceed a threshold, and to reduce the angle of view (F) if the speed decreases below the threshold.

According to the second example embodiment, the processor 780 may be configured to move the center of the angle of view (F) from the origin to the direction of steering by the angle of steering, and to return the center of the angle of view (F) to the origin if the angle of steering is returned.

According to the third example embodiment, the processor 780 may be configured to expand the angle of view (F) if the angle of steering increases to exceed the threshold, and to reduce the angle of view (F) if the angle of steering decreases below the threshold.

According to the fourth example embodiment, the processor 780 may be configured to expand the angle of view (F) in response to the reversing.

According to the fifth example embodiment, the processor 780 may be configured to move the center of the angle of view (F) downward from the origin in response to the reversing.

According to various example embodiments, at least a portion of the driving information may be acquired from the vehicle.

According to some example embodiments, the digital rear mirror device 120 may further include the communication module 730 configured to receive location information of the vehicle and the processor 780 may be configured to compute the speed using the location information.

According to an example embodiment, the processor 780 may be configured to receive the rear view video from the camera device 110, to detect a portion of the rear view video according to the angle of view (F), and to display the detected portion on the display module 750.

According to another example embodiment, the processor 780 may control the camera device 110 to capture the rear view video according to the angle of view (F), to receive the rear view video from the camera device 110, and to display the rear view video on the display module 750.

According to still another example embodiment, the camera device 110 may be configured to capture the rear view video, to detect a portion of the rear view video according to the angle of view (F), and to transmit the detected portion to the digital rear mirror device 120, and the processor 780 may be configured to transmit the angle of view (F) to the camera device 110, to receive the detected portion from the camera device 110, and to display the detected portion on the display module 750.

In the present disclosure, an operating method of the digital rear mirror device 120 of a vehicle may include acquiring driving information of the vehicle while driving the vehicle (operation 840), adjusting the angle of view (F) for a rear view video of the vehicle based on the driving information (operation 860), and displaying the rear view video on the angle of view (F) (operations 820 and 830).

According to various example embodiments, the driving information may include at least one of speed information indicating a speed of the vehicle, steering information related to steering of the vehicle, and reverse information indicating whether the vehicle is reversing.

According to the first example embodiment, the adjusting the angle of view (F) (operation 860) may include expanding the angle of view (F) if the angle of steering increases to exceed the threshold, and reducing the angle of view (F) if the angle of steering decreases below the threshold.

According to the second example embodiment, the adjusting the angle of view (F) (operation 860) may include moving the center of the angle of view (F) from the origin to the direction of steering by the angle of steering, and returning the center of the angle of view (F) to the origin if the angle of steering is returned.

According to the third example embodiment, the adjusting the angle of view (F) (operation 860) may include expanding the angle of view (F) if the angle of steering increases to exceed the threshold, and reducing the angle of view (F) if the angle of steering decreases below the threshold.

According to the fourth example embodiment, the adjusting the angle of view (F) (operation 860) may include expanding the angle of view (F) in response to the reversing.

According to the fifth example embodiment, the adjusting the angle of view (F) (operation 860) may include moving the center of the angle of view (F) downward from the origin in response to the reversing.

According to various example embodiments, at least a portion of the driving information may be acquired from the vehicle.

According to some example embodiments, the acquiring the driving information (operation 840) may include receiving location information of the vehicle, and computing the speed using the location information.

According to an example embodiment, the displaying the rear view video according to the angle of view (F) (operations 820 and 830) may include receiving the rear view video from the camera device 110 (operation 820), and detecting a portion of the rear view video according to the angle of view (F) and displaying the detected portion (operation 830).

According to another example embodiment, the operating method of the digital rear mirror device 120 may further include controlling the camera device 110 to capture the rear view video according to the angle of view (F), and the displaying the rear view video according to the angle of view (F) (operation 830) may include receiving the rear view video from the camera device 110 (operation 820) and displaying the rear view video (operation 830).

According to still another example embodiment, the operating method of the digital rear mirror device 120 may further including transmitting the angle of view (F) to the camera device 110, and, here, the camera device 110 may capture the rear view video, may detect a portion of the rear view video according to the angle of view (F), and may transmit the detected portion to the digital rear mirror device 120, and the displaying the rear view video according to the angle of view (F) (operations 820 and 830) may include receiving the detected portion from the camera device 110 (operation 820), and displaying the detected portion.

In the present disclosure, the digital rear mirror system 100 of a vehicle may include the camera device 110 configured to capture a rear view video of the vehicle, and the digital rear mirror device 120 configured to acquire driving information of the vehicle while driving the vehicle, to adjust the angle of view (F) for the rear view video based on the driving information, and to display the rear view video according to the angle of view (F).

According to various example embodiments, the driving information may include at least one of speed information indicating a speed of the vehicle, steering information related to steering of the vehicle, and reverse information indicating whether the vehicle is reversing.

According to the first example embodiment, the digital rear mirror device 120 may be configured to expand the angle of view (F) if the speed increases to exceed a threshold, and to reduce the angle of view (F) if the speed decreases below the threshold.

According to the second example embodiment, the digital rear mirror device 120 may be configured to move the center of the angle of view (F) from the origin to the direction of steering by the angle of steering, and to return the center of the angle of view (F) to the origin if the angle of steering is returned.

According to the third example embodiment, the digital rear mirror device 120) 780 may be configured to expand the angle of view (F) if the angle of steering increases to exceed the threshold, and to reduce the angle of view (F) if the angle of steering decreases below the threshold.

According to the fourth example embodiment, the digital rear mirror device 120 may be configured to expand the angle of view (F) in response to the reversing.

According to the fifth example embodiment, the digital rear mirror device 120 may be configured to move the center of the angle of view (F) downward from the origin in response to the reversing.

In the present disclosure, an operating method of the digital rear mirror system 100 of a vehicle may include acquiring, by the digital rear mirror device 120, driving information of the vehicle while driving the vehicle (operation 650), adjusting, by the digital rear mirror device 120, the angle of view (F) for a rear view video of the vehicle based on the driving information (operation 660), and displaying, by the digital rear mirror device 120, the rear view video received from the camera device 110 according to the angle of view (F) (operation 690).

According to various example embodiments, the driving information may include at least one of speed information indicating a speed of the vehicle, steering information related to steering of the vehicle, and reverse information indicating whether the vehicle is reversing.

According to the first example embodiment, the adjusting the angle of view (F) (operation 660) may include expanding the angle of view (F) if the speed increases to exceed the threshold, and reducing the angle of view (F) if the speed decreases below the threshold.

According to the second example embodiment, the adjusting the angle of view (F) (operation 660) may include moving the center of the angle of view (F) from the origin to the direction of steering by the angle of steering, and returning the center of the angle of view (F) to the origin if the angle of steering is returned.

According to the third example embodiment, the adjusting the angle of view (F) (operation 660) may include expanding the angle of view (F) if the angle of steering increases to exceed the threshold, and reducing the angle of view (F) if the angle of steering decreases below the threshold.

According to the fourth example embodiment, the adjusting the angle of view (F) (operation 660) may include expanding the angle of view (F) in response to the reversing.

According to the fifth example embodiment, the adjusting the angle of view (F) (operation 660) may include moving the center of the angle of view (F) downward from the origin in response to the reversing.

Figure 9:
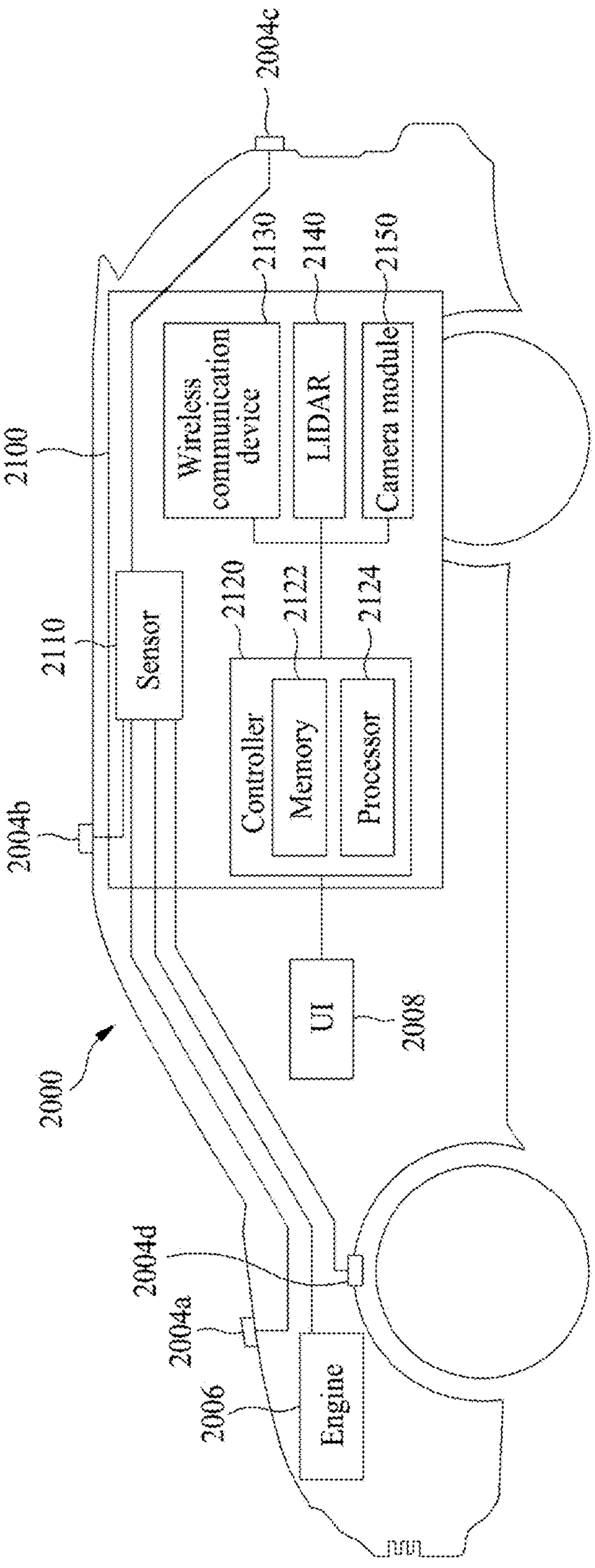
FIG. 9 is a block diagram illustrating a vehicle to which an electronic device is mounted according to various example embodiments is mounted.
Figure 10:
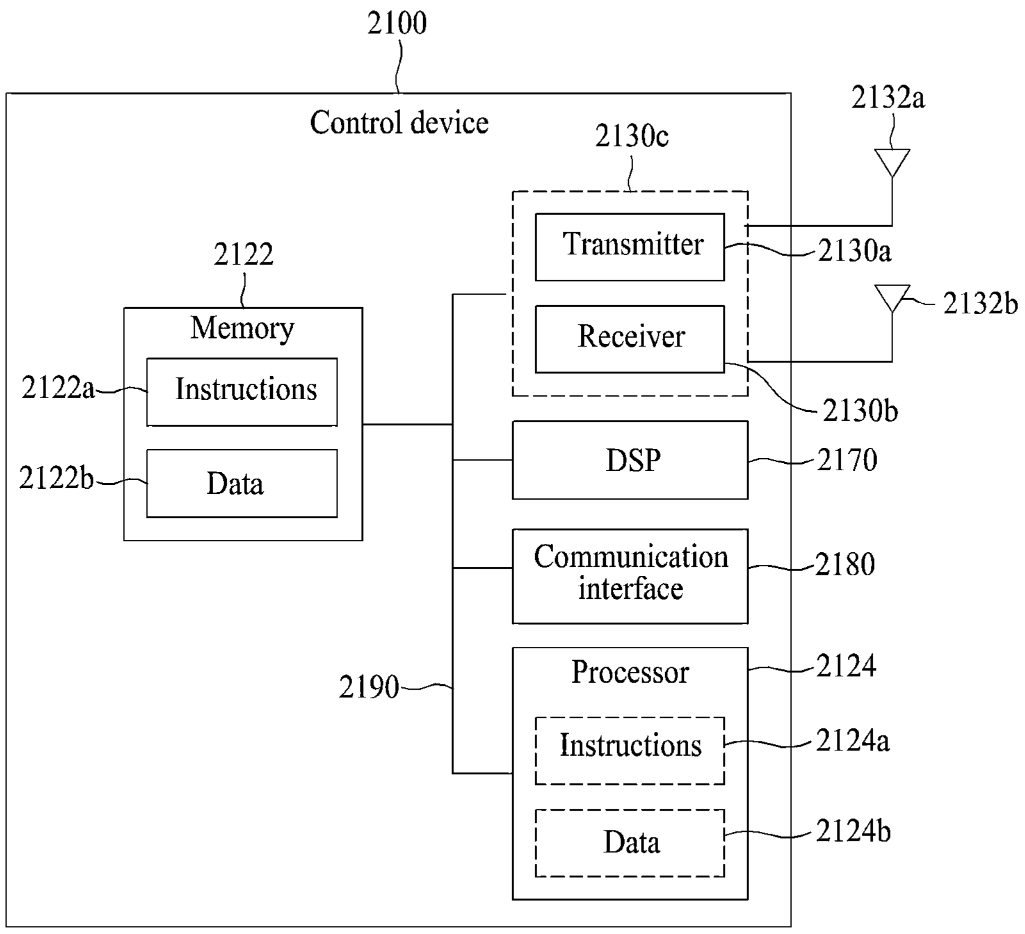
FIG. 10 is a block diagram illustrating a control device of the vehicle of FIG. 9.

FIG. 9 is a block diagram illustrating a vehicle 2000 to which the digital rear mirror system 100 is mounted according to various example embodiments. FIG. 10 is a block diagram illustrating a control device 2100 of the vehicle of FIG. 9.

Referring to FIGS. 9 and 10, the digital rear mirror system 100 according to various example embodiments may be mounted to the vehicle 2000 and the vehicle 2000 may include the control device 2100. Here, the vehicle 2000 may be an autonomous vehicle. In some example embodiments, at least one component of the camera device 110 or at least one component of the digital rear mirror device 120 may be integrated into at least one component of the control device 2100.

The control device 2100 may include a controller 2120 that includes a memory 2122 and a processor 2124, a sensor 2110, a wireless communication device 2130, a light detection and ranging (LIDAR) device 2140, and a camera module 2150.

The controller 2120 may be configured at a time of manufacture by a manufacturing company of the vehicle or may be additionally configured to perform an autonomous driving function after manufacture. Alternatively, a configuration to continuously perform an additional function by upgrading the controller 2120 configured at the time of manufacture may be included.

The controller 2120 may forward a control signal to the sensor 2110, an engine 2006, a user interface (UI) 2008, the wireless communication device 2130, the LIDAR device 2140, and the camera module 2150 included as other components in the vehicle. Also, although not illustrated, the controller 2120 may forward a control signal to an acceleration device, a braking system, a steering device, or a navigation device associated with driving of the vehicle.

The controller 2120 may control the engine 2006. For example, the controller 2120 may sense a speed limit of a road on which the vehicle 2000 is driving and may control the engine 2006 such that a driving speed may not exceed the speed limit, or may control the engine 2006 to increase the driving speed of the vehicle 2000 within the range of not exceeding the speed limit. Additionally, when sensing modules 2004*a*, 2004*b*, 2004*c*, and 2004*d* sense an external environment of the vehicle and forward the same to the sensor 2110, the controller 2120 may receive external environment information, may generate a signal for controlling the engine 2006 or a steering device (not shown), and thereby control driving of the vehicle.

When another vehicle or an obstacle is present in front of the vehicle, the controller 2120 may control the engine 2006 or the braking system to decrease the driving speed and may also control a trajectory, a driving route, and a steering angle in addition to the speed. Alternatively, the controller 2120 may generate a necessary control signal according to recognition information of other external environments, such as, for example, a driving lane, a driving signal, etc., of the vehicle, and may control driving of the vehicle.

The controller 2120 may also control driving of the vehicle by communicating with a nearby vehicle or a central server in addition to autonomously generating the control signal and by transmitting an instruction for controlling peripheral devices based on the received information.

Further, if a location or an angle of view of the camera module 2150 is changed, it may be difficult for the controller 2120 to accurately recognize a vehicle or a lane. To prevent this, the controller 2120 may generate a control signal for controlling a calibration of the camera module 2150. Therefore, the controller 2120 may generate a calibration control signal for the camera module 2150 and may continuously maintain a normal mounting location, direction, angle of view, etc., of the camera module 2150 regardless of a change in a mounting location of the camera module 2150 by a vibration or an impact occurring due to a motion of the autonomous vehicle 2000. When prestored information on an initial mounting location, direction, and angle of view of the camera module 2150 differs from information on the initial mounting location, direction, and angle of view of the camera module 2150 that are measured during driving of the autonomous vehicle 2000 by a threshold or more, the controller 2120 may generate a control signal for performing calibration of the camera module 2150.

The controller 2120 may include the memory 2122 and the processor 2124. The processor 2124 may execute software stored in the memory 2122 in response to the control signal of the controller 2120. In detail, the controller 2120 may store, in the memory 2122, data and instructions for detecting a visual field view from a rear view video of the vehicle 2000, and the instructions may be executed by the processor 2124 to perform one or more methods disclosed herein.

Here, the memory 2122 may be stored in a recording medium executable at the non-volatile processor 2124. The memory 2122 may store software and data through an appropriate external device. The memory 2122 may include random access memory (RAM), read only memory (ROM), hard disk, and a memory device connected to a dongle.

The memory 2122 may at least store an operating system (OS), a user application, and executable instructions. The memory 2122 may store application data and arrangement data structures.

The processor 2124 may be a controller, a microcontroller, or a state machine as a microprocessor or an appropriate electronic processor.

The processor 2124 may be configured as a combination of computing devices. The computing device may be configured as a digital signal processor, a microprocessor, or an appropriate combination thereof.

Also, the control device 2100 may monitor internal and external features of the vehicle 2000 and may detect a state of the vehicle 2000 using at least one sensor 2110.

The sensor 2110 may include at least one sensing module 2004. The sensing module 2004 may be implemented at a specific location of the vehicle 2000 depending on a sensing purpose. The sensing module 2004 may be provided in a lower portion, a rear end, a front end, an upper end, or a side end of the vehicle 2000 and may be provided to an internal part of the vehicle, a tier, and the like.

Through this, the sensing module 2004 may sense driving information, such as the engine 2006, a tier, a steering angle, a speed, a vehicle weight, and the like, as internal vehicle information. Also, the at least one sensing module 2004 may include an acceleration sensor (2110), a gyroscope, an image sensor (2110), a radar, an ultrasound sensor, a LIDAR sensor, and the like, and may sense motion information of the vehicle 2000.

The sensing module 2004 may receive specific data, such as state information of a road on which the vehicle 2000 is present, nearby vehicle information, and an external environmental state such as weather, as external information, and may sense a vehicle parameter according thereto. The sensed information may be stored in the memory 2122 temporarily or in long-term depending on purposes.

The sensor 2110 may integrate and collect information of the sensing modules 2004 for collecting information generated inside and on outside the vehicle 2000.

The control device 2100 may further include the wireless communication device 2130.

The wireless communication device 2130 is configured to implement wireless communication between the vehicles 2000. For example, the wireless communication device 2130 enables the vehicles 2000 to communicate with a mobile phone of a user, another wireless communication device 2130, another vehicle, a central device (traffic control device), a server, and the like. The wireless communication device 2130 may transmit and receive a wireless signal according to a connection communication protocol. A wireless communication protocol may be WiFi, Bluetooth, Long-Term Evolution (LTE), code division multiple access (CDMA), wideband code division multiple access (WCDMA), and global systems for mobile communications (GSM). However, it is provided as an example only and the wireless communication protocol is not limited thereto.

Also, the vehicle 2000 may implement vehicle-to-vehicle (V2V) communication through the wireless communication device 2130. That is, the wireless communication device 2130 may perform communication with another vehicle and other vehicles on the roads through the V2V communication. The vehicle 2000 may transmit and receive information, such as driving warnings and traffic information, through the V2V communication and may also request another vehicle for information or may receive a request from the other vehicle. For example, the wireless communication device 2130 may perform the V2V communication using a dedicated short-range communication (DSRC) device or a cellular-V2V (CV2V) device. Also, in addition to the V2V communication, vehicle-to-everything (V2X) communication, communication between the vehicle and another object (e.g., electronic device carried by pedestrian), may be implemented through the wireless communication device 2130.

Also, the control device 2100 may include the LIDAR device 2140. The LIDAR device 2140 may detect an object around the vehicle 2000 during an operation, based on data sensed using a LIDAR sensor. The LIDAR device 2140 may transmit detection information to the controller 2120, and the controller 2120 may operate the vehicle 2000 based on the detection information. For example, when the detection information includes a vehicle ahead driving at a low speed, the controller 2120 may instruct the vehicle to decrease a speed through the engine 2006. Alternatively, the controller 2120 may instruct the vehicle to decrease a speed based on a curvature of a curve the vehicle enters.

The control device 2100 may further include the camera module 2150. The controller 2120 may extract object information from an external image captured from the camera module 2150, and may process the extracted object information using the controller 2120.

Also, the control device 2100 may further include imaging devices configured to recognize an external environment. In addition to the LIDAR device 2140, a radar, a GPS device, a driving distance measurement device (odometry), and other computer vision devices may be used. Such devices may selectively or simultaneously operate depending on necessity, thereby enabling further precise sensing.

The vehicle 2000 may further include the user interface (UI) 2008 for a user input to the control device 2100. The user interface 2008 enables the user to input information through appropriate interaction. For example, the user interface 2008 may be configured as a touchscreen, a keypad, and a control button. The user interface 2008 may transmit an input or an instruction to the controller 2120, and the controller 2120 may perform a vehicle control operation in response to the input or the instruction.

Also, the user interface 2008 may enable communication between an external device of the vehicle 2000 and the vehicle 2000 through the wireless communication device 2130. For example, the user interface 2008 may enable interaction with a mobile phone, a tablet, or other computer devices.

Further, although the example embodiment describes that the vehicle 2000 includes the engine 2006, it is provided as an example only. The vehicle 2000 may include a different type of a propulsion system. For example, the vehicle 2000 may run with electric energy, and may run with hydrogen energy or through a hybrid system with a combination thereof. Therefore, the controller 2120 may include a propulsion mechanism according to the propulsion system of the vehicle 2000 and may provide a control signal according thereto to each component of the propulsion mechanism.

Hereinafter, a configuration of the control device 2100 for angle of view (F) adjustment for a rear view video of the vehicle 2000 is described with reference to FIG. 10.

The control device 2100 may include the processor 2124. The processor 2124 may be a general-purpose single or multi-chip microprocessor, a dedicated microprocessor, a microcontroller, a programmable gate array, and the like. The processor may also be referred to as a central processing unit (CPU). Also, the processor 2124 may be a combination of a plurality of processors.

The control device 2100 also includes the memory 2122. The memory 2122 may be any electronic component capable of storing electronic information. The memory 2122 may include a combination of memories 2122 in addition to a unit memory.

According to various example embodiments, data and instructions 2122*a* for angle of view (F) adjustment for the rear view video of the vehicle 2000 may be stored in the memory 2122. When the processor 2124 executes the instructions 2122*a*, the instructions 2122*a* and a portion or all of the data 2122*b* required to perform command may be loaded to the processor 2124 (2124*a* and 2124*b*).

The control device 2100 may include a transmitter 2130*a* and a receiver 2130*b*, or a transceiver 2130*c*, to allow transmission and reception of signals. One or more antennas 2132*a* and 2132*b* may be electrically connected to the transmitter 2130*a* and the receiver 2130*b*, or the transceiver 2130*c*, and may include additional antennas.

The control device 2100 may include a digital signal processor (DSP) 2170, and may control the vehicle to quickly process a digital signal through the DSP 2170.

The control device 2100 may also include a communication interface 2180. The communication interface 2180 may include one or more ports and/or communication modules configured to connect other devices to the control device 2100. The communication interface 2180 may enable interaction between the user and the control device 2100.

Various components of the control device 2100 may be connected through one or more buses 2190, and the buses 2190 may include a power bus, a control signal bus, a state signal bus, and a database bus. The components may forward mutual information through the buses 2190 under control of the processor 2124 and may perform desired functions.

The apparatuses described herein may be implemented using hardware components, software components, and/or a combination of the hardware components and the software components. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, other processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, computer storage medium or device, to provide instructions or data to the processing device or be interpreted by the processing device. The software also may be distributed over network coupled computer systems so that the software is stored and executed in a distributed fashion. The software and data may be stored by one or more computer readable storage mediums.

The methods according to various example embodiments may be implemented in a form of a program instruction executable through various computer methods and recorded in computer-readable media. Here, the media may be to continuously store a computer-executable program or to temporarily store the same for execution or download. The media may be various types of record methods or storage methods in which a single piece of hardware or a plurality of pieces of hardware are combined and may be distributed over a network without being limited to a medium that is directly connected to a computer system. Examples of the media include magnetic media such as hard disks, floppy disks, and magnetic tapes; optical media such as CD ROM and DVD; magneto-optical media such as floptical disks; and hardware devices that are specially configured to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software.

Various example embodiments and the terms used herein are not construed to limit description disclosed herein to a specific implementation and should be understood to include various modifications, equivalents, and/or substitutions of a corresponding example embodiment. In the drawings, like reference numerals refer to like components throughout the present specification. The singular forms "a," "an," and "the" are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe corresponding components regardless of order or importance and the terms are simply used to distinguish one component from another component. The components should not be limited by the terms. When a component (e.g., first component) is described to be "(functionally or communicatively) connected to" or "accessed to" another component (e.g., second component), the component may be directly connected to the other component or may be connected through still another component (e.g., third component).

The term "module" used herein may include a unit configured as hardware, software, or firmware, and may be interchangeably used with the terms, for example, "logic," "logic block," "part," "circuit," etc. The module may be an integrally configured part, a minimum unit that performs one or more functions, or a portion thereof. For example, the module may be configured as an application-specific integrated circuit (ASIC).

According to various example embodiments, each of the components (e.g., module or program) may include a singular object or a plurality of objects. According to various example embodiments, at least one of the components or operations may be omitted. Alternatively, at least one another component or operation may be added. Alternatively or additionally, a plurality of components (e.g., modules or programs) may be integrated into a single component. In this case, the integrated component may perform one or more functions of each of the components in the same or similar manner as it is performed by a corresponding component before integration. According to various example embodiments, operations performed by a module, a program, or another component may be performed in a sequential, parallel, iterative, or heuristic manner. Alternatively, at least one of the operations may be performed in different sequence or omitted. Alternatively, at least one another operation may be added.

What is claimed is:

1. A digital rear mirror device of a vehicle, comprising:

a display module configured to display a rear view video of the vehicle; and a processor configured to connect to the display module and to acquire driving information of the vehicle while driving the vehicle, and to adjust an angle of view for the rear view video based on the driving information, wherein the display module is configured to display the rear view video together with reference information including at least one of a distance from an adjacent vehicle to the vehicle or a speed of the adjacent vehicle acquired based on an analysis result of the rear view video, wherein the driving information includes speed information indicating a speed of the vehicle and steering information related to steering of the vehicle, and wherein the processor is configured to:

expand the angle of view only when a first condition in which the speed exceeds a first threshold and a second condition in which an angle of the steering exceeds a second threshold are simultaneously satisfied, without expanding the angle of view when only one of the first condition and the second condition is satisfied, and reduce the angle of view only when a third condition in which the speed decreases to be equal to or less than the first threshold and a fourth condition in which the angle of the steering decreases to be equal to or less than the second threshold are simultaneously satisfied, without reducing the angle of view when only one of the third condition and the fourth condition is satisfied.

2. The digital rear mirror device of claim 1, wherein the driving information includes at least one of speed information indicating a speed of the vehicle, steering information related to steering of the vehicle, and reverse information indicating whether the vehicle is reversing.

3. The digital rear mirror device of claim 2, wherein the processor is configured to, expand the angle of view if the speed increases to exceed a first threshold and an angle of the steering increases to exceed a second threshold, and reduce the angle of view if the speed decreases to be equal to or less than the first threshold and the angle of the steering decreases to be equal to or less than the second threshold.

4. The digital rear mirror device of claim 2, wherein the processor is configured to, move the center of the angle of view from the origin to the direction of steering by the angle of steering, and return the center of the angle of view to the origin if the angle of steering is returned.

5. The digital rear mirror device of claim 2, wherein the processor is configured to expand the angle of view and move the center of the angle of view downward from the origin, in response to the reversing.

6. The digital rear mirror device of claim 2, further comprising:

a communication module configured to receive location information of the vehicle, wherein the processor is configured to compute the speed using the location information.

7. The digital rear mirror device of claim 1, wherein at least a portion of the driving information is acquired from the vehicle.

8. The digital rear mirror device of claim 1, wherein the processor is configured to receive the rear view video from a camera device, to detect a portion of the rear view video according to the angle of view, and to display the detected portion on the display module.

9. The digital rear mirror device of claim 1, wherein the processor is configured to control a camera device to capture the rear view video according to the angle of view, to receive the rear view video from the camera device, and to display the rear view video on the display module.

10. The digital rear mirror device of claim 1, wherein a camera device is configured to capture the rear view video, to detect a portion of the rear view video according to the angle of view, and to transmit the detected portion to the digital rear mirror device, and the processor is configured to transmit the angle of view to the camera device, to receive the detected portion from the camera device, and to display the detected portion on the display module.

11. An operating method of a digital rear mirror device of a vehicle, the method comprising:

acquiring driving information of the vehicle while driving the vehicle;

adjusting an angle of view for a rear view video of the vehicle based on the driving information; and displaying the rear view video according to the angle of view, wherein the displaying comprises displaying the rear view video together with reference information including at least one of a distance from an adjacent vehicle to the vehicle or a speed of the adjacent vehicle acquired based on an analysis result of the rear view video, wherein the driving information includes speed information indicating a speed of the vehicle and steering information related to steering of the vehicle, and wherein adjusting the angle of view comprises:

expanding the angle of view only when a first condition in which the speed exceeds a first threshold and a second condition in which an angle of the steering exceeds a second threshold are simultaneously satisfied, without expanding the angle of view when only one of the first condition and the second condition is satisfied; and reducing the angle of view only when a third condition in which the speed decreases to be equal to or less than the first threshold and a fourth condition in which the angle of the steering decreases to be equal to or less than the second threshold are simultaneously satisfied, without reducing the angle of view when only one of the third condition and the fourth condition is satisfied.

12. The method of claim 11, wherein the driving information includes at least one of speed information indicating a speed of the vehicle, steering information related to steering of the vehicle, and reverse information indicating whether the vehicle is reversing.

13. The method of claim 12, wherein the adjusting the angle of view comprises:

expanding the angle of view if the speed increases to exceed a first threshold and an angle of the steering increases to exceed a second threshold; and reducing the angle of view if the speed decreases to be equal to or less than the first threshold and the angle of the steering decreases to be equal to or less than the second threshold.

14. The method of claim 12, wherein the adjusting the angle of view comprises:

moving the center of the angle of view from the origin to the direction of steering by the angle of steering; and returning the center of the angle of view to the origin if the angle of steering is returned.

15. The method of claim 12, wherein the adjusting the angle of view comprises at least one of:

expanding the angle of view in response to the reversing; and moving the center of the angle of view downward from the origin, in response to the reversing.

16. The method of claim 12, wherein the acquiring the driving information comprises:

receiving location information of the vehicle; and computing the speed using the location information.

17. The method of claim 11, wherein at least a portion of the driving information is acquired from the vehicle.

18. The method of claim 11, wherein the displaying the rear view video according to the angle of view comprises:

receiving the rear view video from a camera device;

detecting a portion of the rear view video according to the angle of view; and displaying the detected portion.

19. The method of claim 11, further comprising:

controlling a camera device to capture the rear view video according to the angle of view, wherein the displaying the rear view video according to the angle of view comprises:

receiving the rear view video from the camera device; and displaying the rear view video.

20. The method of claim 11, further comprising:

transmitting the angle of view to a camera device, wherein the camera device captures the rear view video, detects a portion of the rear view video according to the angle of view, and transmits the detected portion to the digital rear mirror device, and the displaying the rear view video according to the angle of view comprises:

receiving the detected portion from the camera device; and displaying the detected portion.

* * * * *